United States Patent
Wei et al.

(10) Patent No.: US 12,192,013 B2
(45) Date of Patent: Jan. 7, 2025

(54) METHOD AND APPARATUS FOR HANDLING LCP RESTRICTION AND HARQ PROCESS NUMBER

(71) Applicant: Hannibal IP LLC, Frisco, TX (US)

(72) Inventors: Chia-Hung Wei, Taipei (TW); Hsin-Hsi Tsai, Taipei (TW); Chie-Ming Chou, Taipei (TW)

(73) Assignee: Hannibal IP LLC, Frisco, TX (US)

( * ) Notice: Subject to any disclaimer, the term of this patent is extended or adjusted under 35 U.S.C. 154(b) by 86 days.

(21) Appl. No.: 17/942,882

(22) Filed: Sep. 12, 2022

(65) Prior Publication Data

US 2023/0083711 A1 Mar. 16, 2023

Related U.S. Application Data

(63) Continuation of application No. 17/038,436, filed on Sep. 30, 2020, now Pat. No. 11,476,981.

(Continued)

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 5/0032* (2013.01); *H04L 5/0053* (2013.01); *H04W 72/23* (2023.01)

(58) Field of Classification Search
CPC ... H04L 1/1854; H04L 1/1812; H04L 5/0032; H04L 5/0053; H04L 1/1864;
(Continued)

(56) References Cited

U.S. PATENT DOCUMENTS

2018/0324642 A1* 11/2018 Yu .......................... H04L 5/0053
2019/0053325 A1* 2/2019 Yu .......................... H04W 76/15

FOREIGN PATENT DOCUMENTS

WO 2021056562 4/2021

OTHER PUBLICATIONS 5G 3GPP TS 38.212 V15.6.0, 2019, 3rd Generation Partnership Project; Technical Specification Group Radio Access Network; NR; Multiplexing and channel coding (Release 15).

(Continued)

*Primary Examiner* — Charles C Jiang
*Assistant Examiner* — Shawn D Miller
(74) *Attorney, Agent, or Firm* — Marcella M. Bodner; Cole Schotz, P.C.

(57) ABSTRACT

A method for wireless communication performed by a user equipment (UE) is provided. The method includes: receiving, from a base station (BS), a radio resource control (RRC) message that includes a first configuration indicating a first parameter associated with a first bandwidth part (BWP) and a second configuration indicating a second parameter associated with a second BWP; receiving, from the BS, downlink control information (DCI) having a DCI format, the DCI indicating either a data reception or a data transmission on a BWP, and the DCI including a field indicating a hybrid automatic repeat request (HARQ) process number to be applied by the UE for the data reception or the data transmission; determining whether a bit length of the field is fixed or variable according to the DCI format; and in a case that the bit length of the field is variable, determining the bit length of the field according to one of the first parameter and the second parameter that is associated with the BWP.

12 Claims, 10 Drawing Sheets

100A

Related U.S. Application Data

(60) Provisional application No. 62/909,972, filed on Oct. 3, 2019.

(51) Int. Cl.
*H04L 5/00* (2006.01)
*H04W 72/23* (2023.01)

(58) Field of Classification Search
CPC ... H04L 1/1896; H04L 5/0055; H04L 5/0091; H04L 1/1822; H04L 1/1887; H04W 72/23
See application file for complete search history.

(56) References Cited

OTHER PUBLICATIONS

3GPP TSG RAN WG1 Meeting #98, R1-1908408, 2019, R1-1908408, 7.2.6.1, MediaTek Inc., "PDCCH enhancements for eURLLC, Document for: Discussion and Decision".
3GPP TSG RAN WG1 #98, 2019, R1-1908235, ZTE, "On PDCCH enhancements for NR URLLC", 7.2.6, Discussion and Decision.
3GPP TSG RAN WG1 #98, R1-1908158, 2019, Vivo, "PDCCH enhancements for URLLC", 7.2.6.1, Discussion and Decision.
3GPP TSG RAN WG1 Meeting #98, R1-1908051, 2019, 7.2.6.1, Huawei, HiSilicon, "PDCCH enhancements for URLLC", Discussion and Decision.
3GPP TSG RAN WG1 #98, R1-1909099, 2019, Sharp, "Discussion on PDCCH enhancements", 7.2.6.1, Discussion and Decision.
3GPP TSG RAN WG1 Meeting #98, 2019, R1-1909483, 7.2.6.1, Huawei, "Summary of 7.2.6.1 PDCCH enhancements", Discussion and decision.
3GPP TSG-RAN WG1 Meeting #98, R1-1909264, 7.2.6.1, Qualcomm Incorporated, "PDCCH Enhancements for eURLLC", Discussion / Decision.
3GPP TSG RAN WG1 #98, 2019, R1-1908798, Panasonic PDCCH enhancements for NR URLLC, 7.2.6.1, Discussion.
3GPP TSG RAN WG1 Meeting #98, 2019, R1-1908594, CATT, "PDCCH enhancements for URLLC", 7.2.6.1, Discussion and Decision.
3GPP TSG RAN WG1#98, 2019, R1-1908436, 7.2.6.1, Nokia, Nokia Shanghai Bell, On PDCCH Enhancments for NR URLLC, Discussion and Decision.
3GPP TSG RAN WGI Meeting#98, 2019, R1-1909877, 7.2.6.1., Huawei, "Summary of Friday afternoon offline discussion on PDCCH enhancements", Discussion and decision.

* cited by examiner

100A

100B

METHOD AND APPARATUS FOR HANDLING LCP RESTRICTION AND HARQ PROCESS NUMBER

CROSS-REFERENCE TO RELATED APPLICATION(S)

The present patent application is a continuation of U.S. patent application Ser. No. 17/038,436, filed on Sep. 30, 2020, which issued as U.S. Pat. No. 11,476,981 on Oct. 18, 2022, which claims the benefit of and priority of provisional U.S. Patent Application Ser. No. 62/909,972, filed on Oct. 3, 2019, entitled "Application of LCP Restriction and HARQ Process". The disclosures of the above-identified applications are hereby incorporated fully by reference into the present disclosure for all purposes.

FIELD

The present disclosure is related to wireless communication, and specifically, to logical channel prioritization (LCP) restriction and hybrid automatic repeat request (HARQ) processes in cellular wireless communication networks.

BACKGROUND

Abbreviations used in this disclosure:

| Abbreviation | Full name |
|---|---|
| 3GPP | 3$^{rd}$ Generation Partnership Project |
| 5G | 5$^{th}$ Generation |
| ACK | Acknowledgment |
| AS | Access Stratum |
| BFD | Beam Failure Detection |
| BFR | Beam Failure Recovery |
| BS | Base Station |
| BWP | Bandwidth Part |
| C-RNTI | Cell Radio Network Temporary Identifier |
| CA | Carrier Aggregation |
| CRC | Cyclic Redundancy Check |
| CS-RNTI | Configured Scheduling Radio Network Temporary Identifier |
| CSI | Channel State Information |
| CSI-RS | Channel State Information Reference Signal |
| DC | Dual Connectivity |
| DCI | Downlink Control Information |
| DL | Downlink |
| DL-SCH | Downlink Shared Channel |
| DRB | (user) Data Radio Bearer |
| DRX | Discontinuous Reception |
| DTCH | Dedicated Traffic Channel |
| EN-DC | E-UTRA NR Dual Connectivity |
| FR | Frequency Range |
| HARQ | Hybrid Automatic Repeat Request |
| ID | Identifier |
| IE | Information Element |
| LCH | Logical Channel |
| LCP | Logical Channel Prioritization |
| LTE | Long Term Evolution |
| MAC | Medium Access Control |
| MAC CE | MAC Control Element |
| MCG | Master Cell Group |
| MCS-C-RNTI | Modulation Coding Scheme Cell Radio Network Temporary Identifier |
| MIMO | Multi-Input Multi-Output |
| MN | Master Node |
| NACK | Negative Acknowledgment |
| NAS | Non-Access Stratum |
| NDI | New Data Indicator |
| NR | New Radio |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical (layer) |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAR | Random Access Response |
| RF | Radio Frequency |
| RLC | Radio Link Control |
| RNTI | Radio Network Temporary Identifier |
| RRC | Radio Resource Control |
| RS | Reference Signal |
| RSRP | Reference Signal Received Power |
| SCell | Secondary Cell |
| SCG | Secondary Cell Group |
| SDU | Service Data Unit |
| SL | SideLink |
| SLIV | Start and Length Indicator Value |
| SN | Secondary Node |
| SR | Scheduling Request |
| SRB | Signaling Radio Bearer |
| TA | Timing Advance |
| TAG | Timing Advance Group |
| TB | Transport Block |
| TS | Technical Specification |
| UE | User Equipment |
| UL | Uplink |
| UL-SCH | Uplink Shared Channel |
| URLLC | Ultra-Reliable Low Latency Communication |

Various efforts have been made to improve different aspects of wireless communication for cellular wireless communication systems, such as 5G NR by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to LCP restriction and HARQ processes in cellular wireless communication networks.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive, from a BS, an RRC message that includes a first configuration indicating a first parameter associated with a first BWP and a second configuration indicating a second parameter associated with a second BWP; receive, from the BS, DCI having a DCI format, the DCI indicating either a data reception or a data transmission on a BWP, and the DCI including a field indicating a HARQ process number to be applied by the UE for the data reception or the data transmission; determine whether a bit length of the field is fixed or variable according to the DCI format; and in a case that the bit length of the field is variable, determine the bit length of the field according to one of the first parameter and the second parameter that is associated withthe BWP.

According to another aspect of the present disclosure, a method for wireless communication performed by a UE is provided. The method includes: receiving, from a BS, an RRC message that includes a first configuration indicating a first parameter associated with a first BWP and a second configuration indicating a second parameter associated with a second BWP; receiving, from the BS, DCI having a DCI format, the DCI indicating either a data reception or a data transmission on a BWP, and the DCI including a field indicating a HARQ process number to be applied by the UE for the data reception or the data transmission; determining whether a bit length of the field is fixed or variable according to the DCI format; and in a case that the bit length of the field is variable, determining the bit length of the field according to one of the first parameter and the second parameter that is associated with the BWP.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1A:
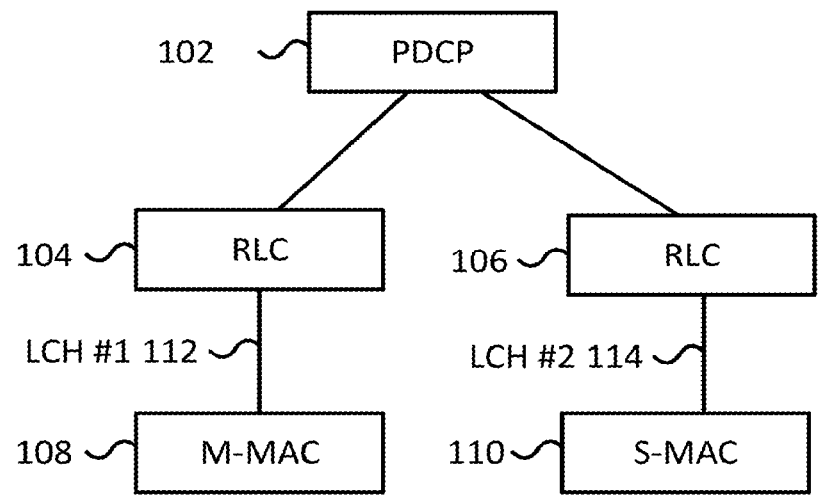
FIG. 1A illustrates an architecture for PDCP duplication in DC mechanism according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

Cell: A radio network object that may be uniquely identified by a UE from a (cell) identification that is broadcast over a geographical area from one UTRAN Access Point. A Cell may be operated in a Frequency Division Duplex (FDD) or a Time Division Duplex (TDD) mode.

Serving Cell: For a UE in an RRC_CONNECTED state and not configured with CA/DC, there may be only one serving cell comprising of the primary cell (PCell). For a UE in the RRC_CONNECTED state and configured with CA/DC, the term "serving cells" may be used to indicate the set of cells comprising of the Special Cell(s) and all secondary cells.

Carrier Aggregation (CA): In CA, two or more Component Carriers (CCs) may be aggregated. A UE may simultaneously receive or transmit on one or multiple CCs depending on its capabilities. CA may be supported for both contiguous and non-contiguous CCs. When CA is applied, the frame timing and the system frame number (SFN) may be aligned across cells that are aggregated. The maximum number of configured CCs for a UE may be 16 for DL and 16 for UL. When CA is configured, the UE may only have one RRC connection with the network. During the RRC connection establishment/re-establishment/handover, one serving cell may provide the NAS mobility information, and during the RRC connection re-establishment/handover, one serving cell may provide the security input, where the serving cell may be referred to as the PCell. Depending on UE capabilities, SCells may be configured to form with the PCell as a set of serving cells. The configured set of serving cells for a UE therefore includes one PCell and one or more SCells.

Configured Grant (CG): A BS (e.g., a gNB) may allocate UL resources for the initial HARQ transmissions to UEs. There are two types of CGs:

Type 1: the RRC entity may directly provide the configured UL grant (including the periodicity).

Type 2: the RRC entity may define the periodicity of the configured UL grant while PDCCH addressed to the CS-RNTI may either signal and activate or deactivate the configured UL grant. The PDCCH addressed to the CS-RNTI may indicate that the configured UL grant may be implicitly reused according to the periodicity defined by the RRC entity until the configured UL grant is deactivated.

When a configured UL grant is active, a UL transmission according to the configured UL grant may be performed if the UE cannot find its C-RNTI/CS-RNTI/MCS-C-RNTI on the PDCCH(s). Otherwise, if the UE finds its C-RNTI/CS-RNTI/MCS-C-RNTI on the PDCCH(s), the PDCCH allocation may override the configured UL grant. The usage of the MCS-C-RNTI may be equivalent to that of the C-RNTI in MAC procedures (except for the C-RNTI MAC CE).

HARQ: A functionality that ensures delivery between peer entities at Layer 1 (e.g., PHY Layer). A single HARQ process may support one TB when the PHY layer is not configured for DL/UL spatial multiplexing. A single HARQ process may support one or multiple TBs when the PHY layer is configured for DL/UL spatial multiplexing. There may be one HARQ entity per serving cell. Each HARQ entity may support parallel processing of (e.g., multiple) DL and UL HARQ processes.

HARQ-ACK: HARQ-ACK may include a 1-bit indicator, where the HARQ-ACK may be a negative Acknowledgement (NACK) when the bit value of the indicator is set to a first value (e.g., "0") and may be a positive Acknowledgement (ACK) when the bit value of the indicator is set to a second value (e.g., "1").

Timer: a MAC entity may setup one or more timers for individual purposes, such as triggering UL signaling retransmission or limiting UL signaling retransmission periods. When a timer (e.g., the timers in various implementations of the present disclosure) maintained by the MAC entity is started, the timer may start running until it stops or expires. The timer may not run if it is not started. The timer may be started if it is not running. The timer may be restarted if it is running. The timer may be started or restarted from its initial value, which may be configured by a BS (e.g., a gNB) via DL RRC signaling, but not limited thereto.

BWP: A subset of the total cell bandwidth of a cell. Bandwidth Adaptation (BA) may be achieved by configuring the UE with BWP(s) and telling the UE which of the configured BWPs is currently the active one. To enable BA on the PCell, a BS (e.g., a gNB) may configure the UE with UL BWP(s) and DL BWP(s). To enable BA on SCells in case of CA, the BS may configure the UE with DL BWP(s) at least (which means there may be no UL BWP configured to the UE). For the PCell, the initial BWP may be the BWP used for initial access. For the SCell(s), the initial BWP may be the BWP configured to the UE to first operate during the SCell activation process. The UE may be configured with a first active uplink BWP via a firstActiveUplinkBWP IE field. If the first active uplink BWP is configured for an SpCell, the firstActiveUplinkBWP IE field may contain the ID of the UL BWP to be activated upon performing the RRC (re-)configuration. If the field is absent, the RRC (re-)configuration may not trigger a BWP switch. If the first active uplink BWP is configured for an SCell, the firstActiveUplinkBWP IE field may contain the ID of the UL BWP to be used upon MAC-activation of the SCell.

PDCCH: A BS (e.g., a gNB) may dynamically allocate DL resources to UEs via the C-RNTI/MCS-C-RNTI/CS-RNTI on PDCCH(s). The UE may monitor the PDCCH(s) to find possible assignments when its DL reception is enabled (e.g., activity governed by DRX when configured). When CA is configured, the same C-RNTI may apply to all serving cells.

PDSCH/PUSCH: A PDCCH may be used to schedule DL transmissions on a PDSCH and UL transmissions on a PUSCH.

Time Alignment Timer: An RRC entity may configure the initial value of a timer (e.g., a time alignment timer, corresponding to the IE "timeAlignmentTimer"). The timer may be used for the maintenance of UL time alignment. The time alignment timer may be maintained per timing advance group. The timer may control how long the MAC entity considers the serving cells belonging to the associated TAG to be UL time aligned.

SLIV: Start and Length Indicator Value for the time domain allocation for PUSCH/PDSCH. SLIV may define the start symbol and the number of consecutive symbols for PUSCH/PDSCH allocation.

TB: Data given from an upper layer (or MAC layer) to a PHY layer may be referred to as a TB.

In order to achieve higher reliability on the data packet transmission for supporting URLLC service, 3 GPP has introduced a PDCP duplication mechanism in RAN for the NR wireless communication system. If the PDCP duplication is configured for a radio bearer via a DL RRC message, at least two RLC bearer may be configured to be associated with the radio bearer (e.g., associated with the PDCP entity configured with the PDCP duplication) to process the duplicated PDCP PDUs. The RLC bearer means the lower layer part of the radio bearer. The RLC bearer may include an RLC entity and an associated LCH. The LCH may be a service access point between a MAC entity and the RLC entity.

In one implementation, duplication in the PDCP layer (i.e., the PDCP duplication function) may include submitting the same PDCP PDUs to the lower layer twice: one on a primary RLC entity (bearer) and the other one on an additional RLC entity (bearer). In one implementation, two copies of the PDCP PDU (i.e., the original PDCP PDU and the corresponding duplicated PDCP PDU) are not transmitted on the same carrier. LCHs of the two RLC bearers may be associated with either a single MAC entity (i.e., CA mechanism) or different MAC entities (i.e., DC mechanism).

FIG. 1A illustrates an architecture 100A for PDCP duplication in DC mechanism according to an example implementation of the present disclosure. The RLC entity 104 and the RLC entity 106 are associated with the PDCP entity 102 to process the duplicated PDCP PDUs. The RLC entity 104 is associated with the M-MAC entity 108 that is associated with an MCG. The M-MAC entity 108 may also be referred to as a master MAC entity. The RLC entity 106 is associated with the S-MAC entity 110 that is associated with an SCG. The S-MAC entity 110 may also be referred to as a secondary MAC entity. LCH #1 112 is between the RLC entity 104 and the M-MAC entity 108. LCH #2 114 is between the RLC entity 106 and the S-MAC entity 110.

The RLC radio bearer associated with the RLC entity 104 may be configured as a primary path (e.g., primaryPath) for the PDCP PDU transmission. The RLC radio bearer associated with the RLC entity 106 may be configured as a secondary transmission path. The RLC entity 104 may also be referred to as the primary RLC entity, and the RLC entity 106 may also be referred to as the secondary RLC entity. The PDCP duplication in DC mechanism may also be referred to as DC-Duplication. It should be noted that the RLC bearer associated with the MAC entity that is associated with the MCG is not necessarily configured as the primary transmission path. The configurations of the primary transmission path and the MCG/SCG may be independently made by the MN (e.g., Master gNB) and the SN (e.g., Secondary gNB) respectively.

Figure 1B:
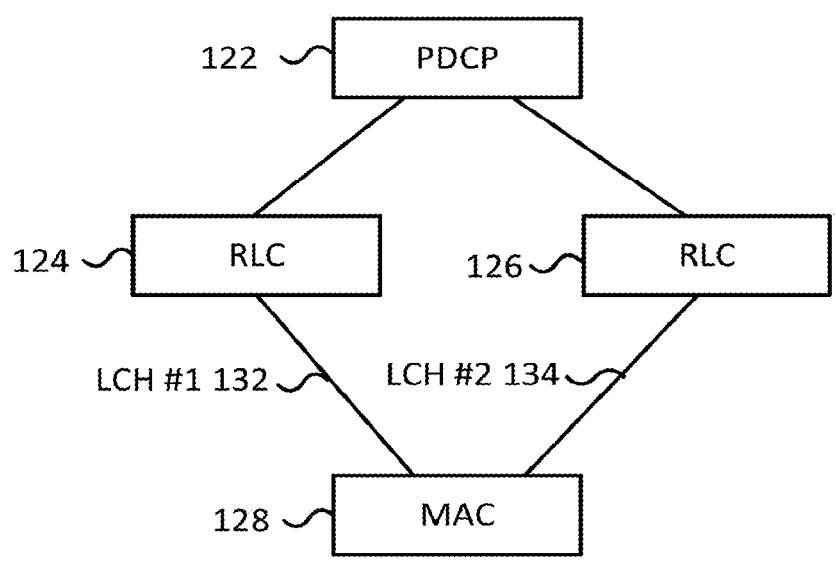
FIG. 1B illustrates an architecture for PDCP duplication in CA mechanism according to an example implementation of the present disclosure.

FIG. 1B illustrates an architecture 100B for PDCP duplication in CA mechanism according to an example implementation of the present disclosure. The RLC entity 124 and the RLC entity 126 are associated with the PDCP entity 122 to process the duplicated PDCP PDUs. Both the RLC entity 124 and the RLC entity 126 are associated with the MAC entity 128. LCH #1 132 is between the RLC entity 124 and the MAC entity 128. LCH #2 134 is between the RLC entity 126 and the MAC entity 128. The PDCP duplication in CA mechanism may also be referred to as CA-Duplication.

Section A: Handling of LCP Restriction

In 3GPP Release 16 (Rel-16), some use cases with tighter requirements in terms of much higher reliability and much lower latency have been identified as an important area for NR evolution. In the reliability aspect, one of the key NR evolutions may be based on the Release 15 (Rel-15) PDCP duplication mechanism. In one implementation, the PDCP duplication mechanism may not be limited to CA-Duplication or DC-Duplication. It is expected that the frequency diversity (typically gained from the CA-Duplication) and spatial diversity (typically gained from the DC-Duplication) may be jointly utilized in a more flexible manner by combining the CA-Duplication with the DC-Duplication. Moreover, the objective of the NR evolution may also include the PDCP duplication with more than two copies of duplicated PDCP PDUs by leveraging (a combination of) CA-Duplication and DC-Duplication. However, the overall spectral efficiency may be reduced by increasing the number of duplicated copies. Therefore, there is a need for a proper restriction with respect to the number of duplicated copies sent via a PDCP entity when more than two duplication paths are available (e.g., when more than two RLC bearers are associated with the PDCP entity for the duplication function).

Furthermore, regarding both the PDCP PDU transmission procedure in the PDCP entity and corresponding MAC SDU (which may be received by the MAC entity on the LCH(s) applied by the PDCP entity for the PDCP duplication) multiplexing and assembly procedure in the MAC entity, there is a need for an improved and efficient mechanism for a UE to handle the PDCP duplication with more than two configured duplication paths.

A new duplication mechanism "Combine-Duplication" that combines the CA-Duplication and the DC-Duplication is disclosed in the present disclosure. When a PDCP entity is configured with the Combine-Duplication, multiple (e.g., at least three) RLC bearers may be configured to be associated with the PDCP entity. Among the associated RLC bearers, at least two of the RLC bearers may be configured to be associated with a same MAC entity, and the other RLC bearer(s) may be associated with another MAC entity. In one implementation, an alternative Combine-Duplication mechanism may have more than two MAC entities involved in the PDCP duplication.

Figure 2:
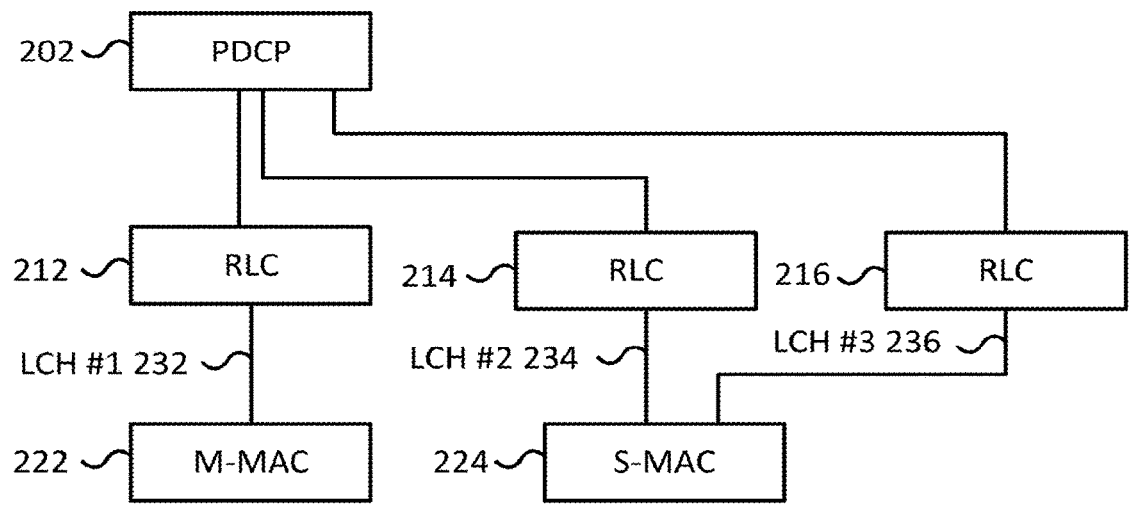
FIG. 2 illustrates an architecture for Combine-Duplication according to an example implementation of the present disclosure.

FIG. 2 illustrates an architecture 200 for Combine-Duplication according to an example implementation of the present disclosure. The PDCP entity 202 is configured with the Combine-Duplication is associated with three RLC entities, including RLC entity 212, RLC entity 214, and RLC entity 216. The RLC entity 212 is associated with LCH #1 232 and M-MAC 222. The RLC entity 214 is associated with LCH #2 234 and S-MAC 224. The RLC entity 216 is associated with LCH #3 236 and S-MAC 224.

Figure 3:
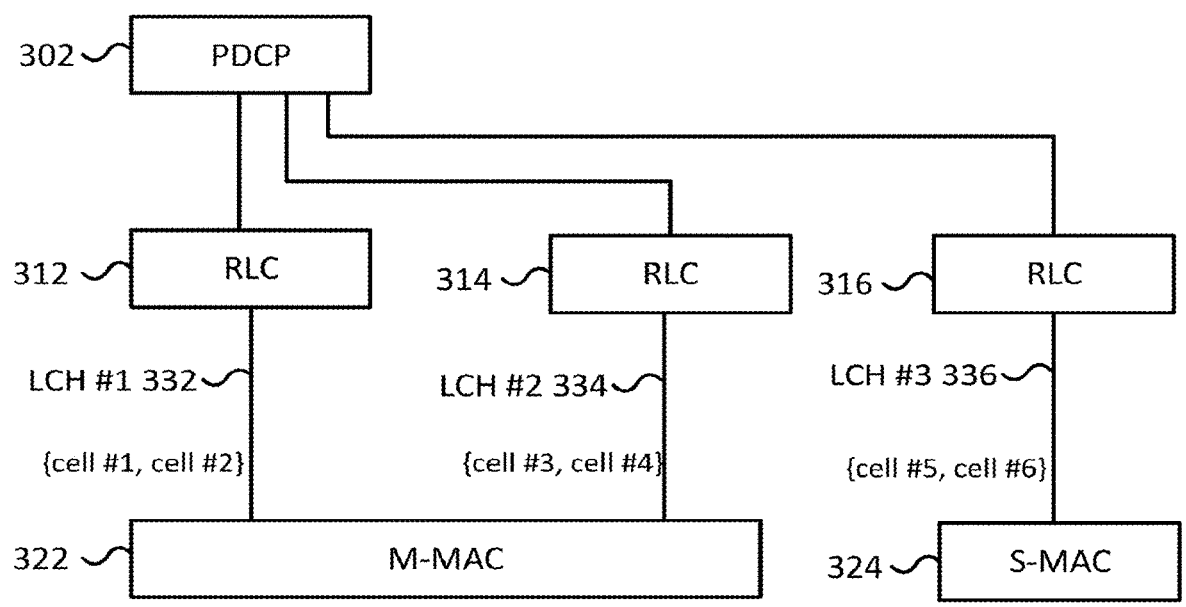
FIG. 3 illustrates an architecture for Combine-Duplication according to another example implementation of the present disclosure.

FIG. 3 illustrates an architecture 300 for Combine-Duplication according to another example implementation of the present disclosure. The PDCP entity 302 configured with the Combine-Duplication is associated with three RLC entities, including RLC entity 312, RLC entity 314, and RLC entity 316. The RLC entity 312 is associated with LCH #1 332 and M-MAC 322. The RLC entity 314 is associated with LCH #2 334 and M-MAC 322. The RLC entity 316 is associated with LCH #3 336 and S-MAC 324.

In one implementation, PDCP (entity) related configuration(s), RLC bearer related configuration(s), and MAC related configuration(s) may be included in a DL RRC message that is transmitted by a BS (e.g., a gNB) for configuring a UE's AS layer. The DL RRC message may be RRCReconfiguration, RRCResume, RRCReestablishment, RRCSetup or any other DL unicast RRC message.

The DL RRC message may include multiple IEs. In one implementation, the PDCP related configuration may be in a PDCP (entity) specific IE PDCP-Config. In one implementation, the RLC bearer related configuration may be in an RLC bearer specific IE RLC-BearerConfig. In one implementation, the MAC related configuration may be in an LCH specific IE LogicalChannelConfig. The PDCP entity of the UE may be configured with PDCP duplication be receiving the DL RRC message from the BS. The PDCP entity may also be configured with its association with corresponding RLC bearer(s) via the DL RRC message.

The NR wireless communication system of 3GPP Release 15 has introduced a cell restriction, allowedservingcell IE, which may be independently configured by the BS for each of the configured LCHs. The BS may configure a set (list) of allowed serving cell(s) for each LCH via the allow edservingcell IE. Afterward, the MAC entity of the UE may apply the configured allow edservingcell IE upon UL MAC PDU transmission. In other words, once the cell restriction, allow edservingcell IE, is provided to an LCH, the cell restriction may be applied to the LCH during a MAC PDU multiplexing and assembly procedure. The cell restriction, allowedservingcell IE, may be also referred to as LCP restriction since the LCP procedure is performed based on the allow edservingcell IE.

For example, an LCH may be configured with an allowedservingcell by a gNB via a DL RRC message. The allowedservingcell may indicate a list of serving cell(s). UL MAC SDUs from the LCH may be mapped to only the serving cells indicated in the list. During the multiplexing and assembly procedure, the MAC entity of the UE may only allocate a PUSCH resource granted by the gNB to the LCH if the PUSCH resource is located on one of the serving cells indicated in the list. If the LCH is not configured with the allowedservingcell, the UL MAC SDUs from the LCH may be mapped to any configured serving cell of this cell group.

Referring to the architecture 100B for CA-Duplication illustrated in FIG. 1B, both the LCH #1 132 and the LCH #2 134 may be configured with allowedservingcell IEs. The LCH #1 132 and LCH #2 134 may be offered to the RLC entity 124 and the RLC entity 126, respectively, by MAC entity 128. The RLC entity 124 and the RLC entity 126 are both associated with the PDCP entity 122 that is configured with the PDCP duplication function.

One of the important purposes of configuring the allowedservingcell IE in the CA-Duplication scenario is to avoid duplicated PDCP PDU(s) transmitted via the same serving cell during the multiplexing and assembly procedure. Therefore, a first serving cell list in the allowedservingcell IE provided to the LCH #1 132 may be different from a second serving list in the allow edservingcellIE provided to the LCH #2 134. In one implementation, each of the serving cells configured to the MAC entity 128 may be listed/contained in either the allowedservingcell IE of LCH #1 132 or the allowedservingcell IE of LCH #2 134. In other words, a serving cell in the allowedservingcell IE of LCH #1 132 may not be in the allowedservingcell IE of LCH #2 134. A serving cell in the allowedservingcell IE of LCH #2 134 may not be in the allowedservingcell IE of LCH #1 132. In one implementation, the configured allowedservingcell TE for the LCHs in the CA-Duplication may become unimportant or irrelevant when the duplication function is deactivated, since the PDCP PDU is not duplicated.

When the PDCP duplication is deactivated, the PDCP entity may only submit the PDCP PDU to one of the associated RLC entities. Therefore, it may be beneficial for the MAC entity of the UE to not apply (e.g., to ignore) the allowedservingcell IE provided to the LCHs serving for the PDCP entity that is configured with CA-Duplication when the PDCP duplication is deactivated.

In one implementation, a PDCP entity configured with PDCP duplication function may be associated with more than two RLC bearers. Each of the RLC bearers may be activated or deactivated independently. For example, only a subset of the associated RLC bearers may be activated at the same time. When the PDCP duplication function is activated, each PDCP PDU may only be submitted to the RLC bearers that are activated. In one implementation, the activated RLC bearers may be indicated by the BS, selected by the BS, or selected by the UE.

Furthermore, the activation and deactivation of each RLC bearer may be dynamically indicated/changed when the duplication function is activated. It may also be beneficial for the UE to not apply (e.g., to ignore) the allowedservingcell IE configured for one or more specific LCHs offered to the PDCP entity that is configured with the duplication function when the PDCP duplication is activated.

Figure 4:
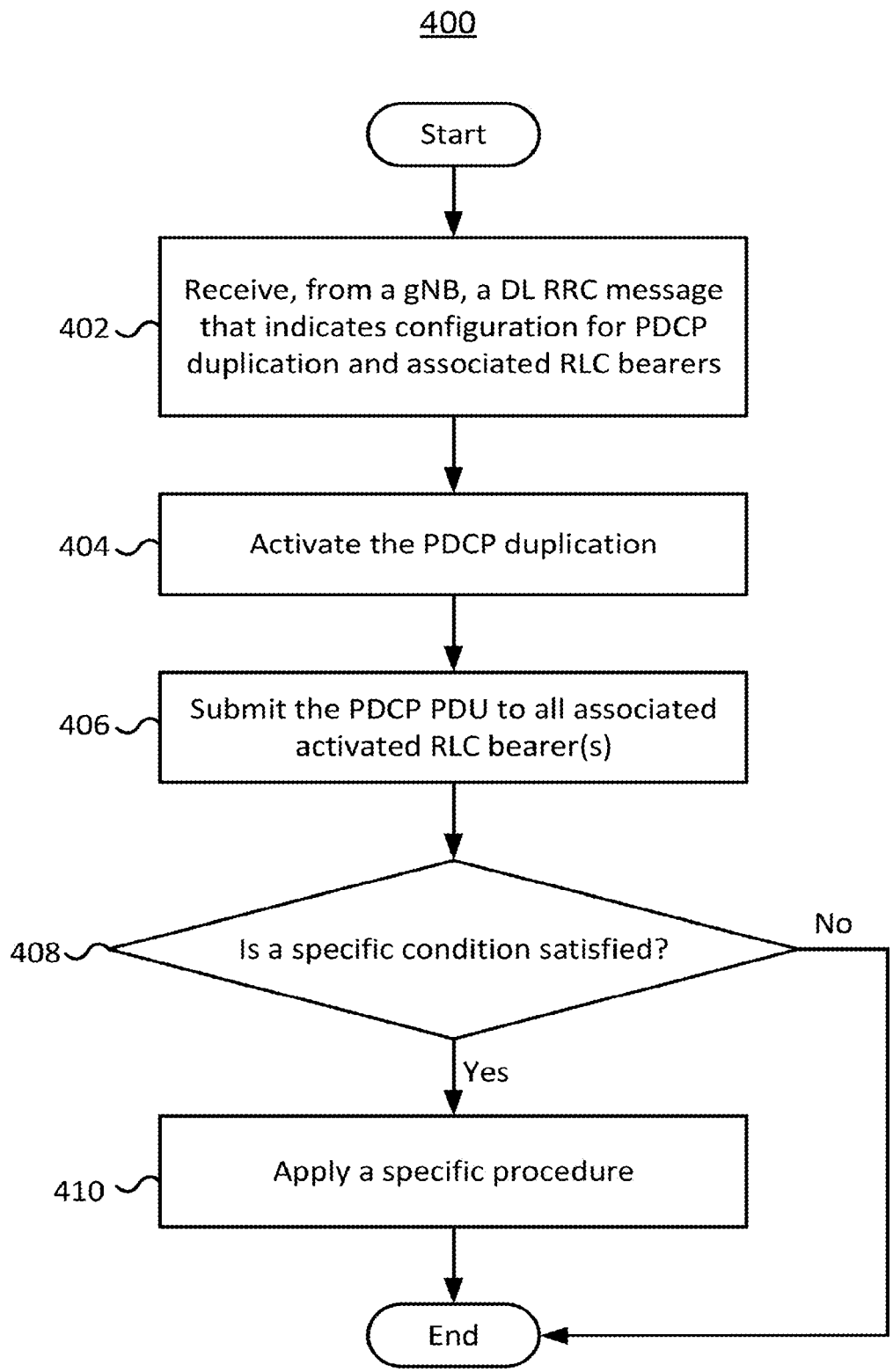
FIG. 4 illustrates a method performed by a UE for handling PDCP duplication according to an example implementation of the present disclosure.

FIG. 4 illustrates a method 400 performed by a UE for handling PDCP duplication according to an example implementation of the present disclosure. In action 402, the UE (e.g., the RRC layer of the UE) may receive, from a gNB, a DL RRC message that indicates configuration for PDCP duplication and associated RLC bearers. For example, the UE may be configured with the topology of the architecture for PDCP duplication, which may include a PDCP entity, multiple RLC entities associated with the PDCP entity, and one or more MAC entities associated with the RLC entities. In one implementation, the configuration may also include the allowedservingcell IE for the LCH of each RLC bearer.

In action 404, the UE may activate the PDCP duplication. In one implementation, the PDCP duplication of the PDCP entity may be activated by the gNB either via RRC signaling (e.g., indicated by the gNB via the configuration for the PDCP duplication) or a DL MAC CE. In one implementation, the PDCP duplication of the PDCP entity may also be activated by the UE itself. In one implementation, the PDCP duplication of the PDCP entity may also be activated by the UE itself when some pre-defined/pre-determined criteria are satisfied. In one implementation, the criteria may include that HARQ/RLC retransmission times reaches a threshold. In one implementation, the criteria may include that a measurement result of a DL reference signal is lower than a threshold.

In action 406, the UE (e.g., the PDCP entity of the UE) may submit the PDCP PDU to all associated activated RLC bearer(s). For example, the UE may be configured with multiple RLC bearers, but only a subset of the configured RLC bearers are activated. The UE may submit the PDCP PDU to only the activated RLC bearers.

In action 408, the UE (e.g., the MAC entity of the UE, or the PDCP entity of the UE) may determine whether a specific condition is satisfied (or multiple specific conditions are satisfied). If the specific condition is satisfied, in action 410, the UE (e.g., the MAC entity of the UE, or the PDCP entity of the UE) may apply a specific procedure. The specific procedure in action 410 may include, but not limited to, processes performed based on the allowedservingcell IE, if configured, of some specific LCH(s) offered to the PDCP entity when the PDCP duplication is activated.

Some implementations regarding action 408 and action 410 are in the following cases.

It should be noted that the implementations listed below may be logically combined. The implementations may be based on a scenario in which the PDCP entity is configured with Combine-Duplication (or CA-Duplication, DC-Duplication) and the specific LCH(s) belongs to an RLC bearer that belongs to a cell group (or is associated with a MAC entity).

Case 1: Implementations of the Specific Condition in Action 408

The specific condition may include that there is one or more specific LCH disclosed as implementations as follows, but not limited thereto.

Case 1-1: the Specific Condition in Action 408 May be Satisfied when the Specific LCH is configured with a specific IE (e.g., NotApplyAllowedservingcell) via an LCH specific configuration (e.g., LogicalChannelConfig). The specific IE (e.g., NotApplyAllowedservingcell) may indicate that the UE does not apply the allow edservingcell IE of the specific LCH. In one implementation, the allow edservingcell IE may still be applied when the specific condition in action 408 is not satisfied. For example, the duplication is activated, and within the cell group to which the specific LCH belongs, there are more than one activated RLC bearer associated with the PDCP duplication. Corresponding text proposals are illustrated in Table 1 and Table 2. Table 1 below illustrates an example logical channel configuration (e.g., LogicalChannelConfig). Table 2 below lists fields in the logical channel configuration.

TABLE 1

LogicalChannelConfig
The IE LogicalChannelConfig is used to configure the logical channel parameters.
-- ASN1START
-- TAG-LOGICALCHANNELCONFIG-START
LogicalChannelConfig ::=                         SEQUENCE {
    ul-SpecificParameters                        SEQUENCE {
        priority                                     INTEGER (1..16),
        prioritisedBitRate                           ENUMERATED {kBps0, kBps8, kBps16,
kBps32, ..., infinity},
        bucketSizeDuration                           ENUMERATED {ms5, ms10, ms20, ms50, ...,
ms1000,
spare7, ...,spare2, spare1},
        allowedServingCells                          SEQUENCE (SIZE (1..maxNrofServingCells-
1)) OF ServCellIndex
OPTIONAL,    -- PDCP-CADuplication
        allowedSCS-List                              SEQUENCE (SIZE (1..maxSCSs)) OF TABLE 1-continued

```
SubcarrierSpacing                              OPTIONAL,   -- Need R
    maxPUSCH-Duration                          ENUMERATED {ms0p02, ms0p04, ...,
ms0p5, spare2, spare1}
OPTIONAL,    -- Need R
    configuredGrantType1Allowed                ENUMERATED {true}
OPTIONAL,    -- Need R
    logicalChannelGroup                        INTEGER (0..maxLCG-ID)
OPTIONAL,    -- Need R
    schedulingRequestID                        SchedulingRequestId
OPTIONAL,    -- Need R
    logicalChannelSR-Mask                      BOOLEAN,
    logicalChannelSR-DelayTimerApplied   BOOLEAN,
    ...,
    bitRateQueryProhibitTimer    ENUMERATED { s0, s0dot4, s0dot8,
s1dot6, s3, s6, s12,s30}                       OPTIONAL     -- Need R
    }
OPTIONAL,   -- Cond UL
    ...
    NotApplyAllowedservingcell   ENUMERATED {true}          OPTIONAL,   -- Need
R
    }
-- TAG-LOGICALCHANNELCONFIG-STOP
-- ASN1STOP
```

TABLE 2

| LogicalChannelConfig field descriptions |
|---|
| allowedSCS-List |
| If present, UL MAC SDUs from this logical channel can only be mapped to the indicated numerology. Otherwise, UL MAC SDUs from this logical channel can be mapped to any configured numerology. Only the values 15/30/60 kHz (for FR1) and 60/120 kHz (for FR2) are applicable. Corresponds to 'allowedSCS-List' as specified in TS 38.321. |
| allowedServingCells |
| If present, UL MAC SDUs from this logical channel can only be mapped to the serving cells indicated in this list. Otherwise, UL MAC SDUs from this logical channel can be mapped to any configured serving cell of this cell group. Corresponds to 'allowedServingCells' in TS 38.321. |
| bitRateQueryProhibitTimer |
| The timer is used for bit rate recommendation query in 3GPP TS 38.321, in seconds. Value s0 means 0 s, s0dot4 means 0.4 s and so on. |
| bucketSizeDuration |
| Value in ms. ms5 corresponds to 5 ms, value ms10 corresponds to 10 ms, and so on. |
| configuredGrantType1Allowed |
| If present, UL MAC SDUs from this logical channel can be transmitted on a configured grant type 1. Corresponds to 'configuredGrantType1Allowed' in 3GPP TS 38.321. |
| logicalChannelGroup |
| ID of the logical channel group, as specified in 3GPP TS 38.321, to which the logical channel belongs. |
| logicalChannelSR-Mask |
| Controls SR triggering when a configured uplink grant of type1 or type2 is configured. true indicates that SR masking is configured for this logical channel as specified in 3GPP TS 38.321. |
| logicalChannelSR-DelayTimerApplied |
| Indicates whether to apply the delay timer for SR transmission for this logical channel. Set to false if logicalChannelSR-DelayTimer is not included in BSR-Config. |
| maxPUSCH-Duration |
| If present, UL MAC SDUs from this logical channel can only be transmitted using uplink grants that result in a PUSCH duration shorter than or equal to the duration |

TABLE 2-continued

LogicalChannelConfig field descriptions indicated by this field. Otherwise, UL MAC SDUs from this logical channel can be transmitted using an uplink grant resulting in any PUSCH duration. Corresponds to "maxPUSCH-Duration" in 3GPP TS 38.321
priority Logical channel priority, as specified in 3GPP TS 38.321.
prioritisedBitRate Value in kiloBytes/s. Value kBps0 corresponds to 0 kiloBytes/s, value kBps8 corresponds to 8 kiloBytes/s, value kBps16 corresponds to 16 kiloBytes/s, and so on. For SRBs, the value can only be set to infinity.
schedulingRequestId If present, it indicates the scheduling request configuration applicable for this logical channel, as specified in 3GPP TS 38.321.
NotApplyAllowedservingcell If present, it indicates the logical channel mapping restriction is removed when the specific condition in action 408 in FIG. 4 is satisfied; or
If present, it indicates the logical channel mapping restriction considers all the allowed cells for all logical channels (belonging to the same cell group/associated with the same MAC entity) of the DRB for which duplication is activated.

---

Case 1-2: the specific condition in action 408 may be satisfied when the UE has received a specific DL MAC CE (e.g., CellRestriction MAC CE). The CellRestriction MAC CE may indicate whether the UE applies the configured allow edservingcell IE for the specific LCH. In one implementation, the CellRestriction MAC CE may be identified with an individual logical channel identity (LCID) by the MAC entity of the UE in a MAC PDU received from the gNB. In one implementation, the CellRestriction MAC CE may include zero, one or multiple fields listed below, but not limited thereto:
  a logical channel ID;
  a bitmap with multiple bits, with each bit corresponding to an LCH associated with the PDCP entity;
  a bitmap with multiple bits, with each bit corresponding to an LCH that is (a) in a cell group in which the CellRestriction MAC CE is received and (b) associated with the PDCP entity.
  a DRB ID; and
  an SRB ID;
In one implementation, a bit in the bitmap having a value '1' may indicate that the corresponding allowedservingcell IE is applied, while the bit having a value '0' may indicate that the allowedservingcell IE is not applied. In one implementation, the order of bits in the bitmap may be based on an ascending order or a descending order of the logical channel IDs associated with the PDCP entity. In one implementation, the order of bits in the bitmap may be based on an ascending order or a descending order of the logical channel IDs, which may include LCH(s) not associated with the PDCP entity.

Case 1-3: the specific condition in action 408 may be satisfied when the UE has received a specific DL MAC CE (e.g., CellRestriction MAC CE). Different from Case 1-2, the CellRestriction MAC CE may be applied by the gNB to indicate whether to apply the allowedservingcell IE of each LCH when the duplication is not configured or when the duplication is configured but not activated.

Case 1-4: the specific condition in action 408 may be satisfied when the specific LCH is indicated whether or not the corresponding allowedservingcell IE is valid based on a MAC CE. In one implementation, the gNB may indicate whether the UE needs to apply the allowedservingcell IE of the specific LCH via a MAC CE. For example, the MAC CE may include a field (e.g., a bitmap) to indicate the LCH(s), and the MAC CE may include a field (e.g., a bit) to indicate whether or not the allowedservingcell IE for each LCH is valid. In one implementation, the LCH(s) included in the MAC CE may correspond to the LCH(s) configured with the PDCP duplication function.

Case 1-5: the specific condition in action 408 may be satisfied when the specific LCH belongs to a specific RLC bearer. In one implementation, the specific RLC bearer is the only activated RLC bearer among all RLC bearers that are (a) associated with the PDCP entity and (b) belonging to the same cell group (or associated with the same MAC entity). Referring to the architecture 300 illustrated in FIG. 3, there are three RLC bearers associated with the PDCP entity 302. RLC bearer #1 includes RLC entity 312 and LCH #1 332, RLC bearer #2 includes RLC entity 314 and LCH #2 334. RLC bearer #3 includes RLC entity 316 and LCH #3 336. The RLC bearer #1 and the RLC bearer #2 belong to the MCG, and the RLC bearer #3 belongs to the SCG. LCH #1 332 is offered to RLC entity 312 by M-MAC 332. LCH #2 334 is offered to RLC entity 314 by M-MAC 332. LCH #3 336 is offered to RLC entity 316 by S-MAC 324. The allowedservingcell IE provided to the LCH #1 332 includes {cell #1, cell #2}. The allowedservingcell IE provided to the LCH #2 334 includes {cell #3, cell #4}. The allowedservingcell IE provided to the LCH #3 336 includes {cell #5, cell #6}.

When the duplication function is activated and when RLC bearer #1 and RLC bearer #3 is activated and RLC bearer #2 is deactivated, LCH #1 332 is the only activated RLC bearer among all RLC bearers (e.g., RLC bearer #1 and RLC bearer #2) within a cell group (e.g., MCG) to which the LCH #1 332 belongs. In one implementation, the M-MAC 322 may not apply the allowedservingcell configured for the LCH #1 332. In one implementation, the M-MAC 322 may not apply the allowedservingcell configured for the LCH #1 332 if the LCH #1 332 is configured with the NotApplyAllowedservingcell. In one implementation, an RLC bearer may be activated/deactivated by a MAC CE. Each RLC bearer may be activated/deactivated independently.

Case 1-6: the specific condition in action 408 may be satisfied when the specific LCH belongs to a specific RLC bearer. In one implementation, the specific RLC bearer is the only RLC bearer belonging to a cell group (or associated with a MAC entity). Referring to the architecture 200 illustrated in FIG. 2, because LCH #1 232 and the associated RLC bearer is the only RLC bearer associated with the M-MAC 222, the UE may not apply the allowedservingcell IE configured for the LCH #1 232. On the other hand, the UE may apply the allowedservingcell TE configured for the LCH #2 234 and the allowedservingcell IE configured for the LCH #3 236.

Case 1-7: the specific condition in action 408 may be satisfied when the specific LCH belongs to a specific RLC bearer. In one implementation, the specific RLC bearer is the only activated RLC bearer among all RLC bearers that are associated with the PDCP entity configured with the PDCP duplication function.

Referring to the architecture 100B illustrated in FIG. 1B, the PDCP entity 122 is configured with CA-Duplication. When CA-Duplication is deactivated, the RLC bearer to which the LCH #1 132 belongs (e.g., the RLC bearer associated with the RLC entity 124) may be the only activated RLC bearer among all RLC bearers that are associated with the PDCP entity 122. When CA-Duplication is deactivated, the RLC entity 124 may be the only activated RLC entity of the DRB in the MAC entity 128. In one implementation, the MAC entity 128 may not apply the allowedservingcell IE configured for the LCH #1 132 when CA-Duplication is deactivated.

Case 1-8: the specific condition in action 408 may be satisfied when the specific LCH is configured with a specific IE via a PDCP specific configuration (e.g., PDCP-Config). The specific IE may indicate that the UE does not apply the allowedservingcell IE of the specific LCH. The PDCP specific configuration may be provided to the PDCP entity to which the specific LCH is offered. In one implementation, the specific IE may further indicate which LCH does not apply the allowedservingcell IE.

Case 1-9: the specific condition in action 408 may be satisfied when the specific LCH belongs to a specific cell group. In one implementation, the specific cell group may be the MCG. In one implementation, the specific cell group may be the SCG.

It should be noted that the implementations in the present disclosure may be applied via a PDCP entity configured with PDCP duplication. The PDCP entity may be associated with a data radio bearer (DRB) or signaling radio bearer (SRB). The DRB mentioned in the disclosed implementations may be replaced by an SRB.

It should be noted that the specific LCH may be configured with a specific IE via an LCH specific configuration (e.g., LogicalChannelConfig). The specific IE indicates that the UE may determine whether or not the allowedservingcell IE is valid based on the previously disclosed criteria. For example, if the specific IE of the specific LCH indicates TRUE, the UE may apply one of the previously disclosed criteria to determine whether or not the allowedservingcell IE is valid for the specific LCH. If the specific IE of the specific LCH indicates FALSE, the UE may not apply one of the above criteria to determine whether or not the allowedservingcell IE is valid for the specific LCH. The UE may follow the same behavior as Rel-15 PDCP mechanism.

Case 2: Implementations of the Specific Procedure in Action 410

Case 2-1: the UE may not apply the allowedservingcell IE of the specific LCH.

Case 2-2: the UE may consider the allowedservingcell IE of the specific LCH as including the serving cell lists within the allowedservingcell IE of all LCHs belonging to the RLC bearers that are associated with the PDCP entity and belong to the same cell group as the specific LCH. For example, if there are two LCHs, LCH #1 and LCH #2, that are (a) associated with the PDCP entity and (b) belonging to the same cell group, the UE may consider the allowedservingcell IE of the LCH #1 as equal to the combination of the allowedservingcell IE provided to the LCH #1 and the allowedservingcell IE provided to the LCH #2. In other words, all the serving cells in the allowed serving cell lists of the LCHs that are (a) associated with the PDCP entity and (b) in the same cell group to which the specific LCH belongs may be considered as the allowed serving cells. The MAC entity may allocate the PUSCH resource on the allowed serving cell to the MAC SDU on these LCHs. Referring to the architecture 300 illustrated in FIG. 3, the UE may consider the allowedservingcell IE of the LCH #1 332 as {cell #1, cell #2, cell #3, cell #4} when performing action 410 in FIG. 4.

Case 2-3: the UE may apply another preconfigured allowedservingcell IE of the specific LCH.

Section B: Indication of HARQ Process ID

In an NR wireless communication system, DL data reception at the UE side is achieved by monitoring PDCCH and finding possible assignment on the PDCCH. The assignment may be represented as UE specific DCI, which may be found on a PDCCH (candidate). DCI may indicate a DL data reception on a PDSCH.

The UE may be configured to periodically, discontinuously, or continuously monitor PDCCH and find possible DL scheduling and dynamic UL grant (scheduling) scheduled by a BS (e.g., a gNB) via the PDCCH. Scheduling for DL data reception on a PDSCH and a UL grant may be received via a UE specific DCI. The DCI may have CRC bits scrambled by UE specific RNTI (e.g., C-RNTI, CS-RNTI or MCS-CRNTI) and the DCI may be found on the PDCCH (candidate) via blind decoding. The DCI may indicate DL data reception on a PDSCH. The DCI may also indicate instructions related to HARQ feedback information (e.g., HARQ-ACK) corresponding to the DL data. In one implementation, the DCI may indicate time and frequency resources of the PDSCH and indicate timing information regarding when the UE performs corresponding HARQ-ACK transmission. The DCI may also indicate a HARQ process (e.g., by indicating a HARQ process ID) to the UE. The HARQ process indicated by the HARQ process ID may handle the corresponding DL data reception.

The DCI may indicate a UL grant for a PUSCH. In one implementation, the DCI may indicate time and frequency resources of the PUSCH. Afterward, the UE may perform corresponding UL data (e.g., a TB) transmission on the PUSCH by utilizing the UL grant. In one implementation, the PUSCH transmission(s) may be dynamically scheduled by the UL grant in the DCI received from a BS. In one implementation, the PUSCH transmission(s) may correspond to a configured grant Type 1 or Type 2 as disclosed in the 3GPP TS 38.331 and TS 38.321.

In one implementation, the DCI may include an NDI field that indicates a value corresponding to the PUSCH. By comparing the value of the NDI of the scheduled PUSCH with the value of the NDI of a previously scheduled PUSCH that shares the same HARQ process ID as the scheduled PUSCH, the UE may recognize whether the scheduled PUSCH is for new transmission (also referred to as initial transmission) or retransmission. In other words, the DCI may indicate not only the time and frequency resources of the PUSCH but also whether the PUSCH is for new transmission or retransmission. The DCI may also indicate a HARQ process (e.g., by indicating a HARQ process ID) to the UE. The HARQ process indicated by the HARQ process ID may handle the corresponding UL data reception.

Figure 5:
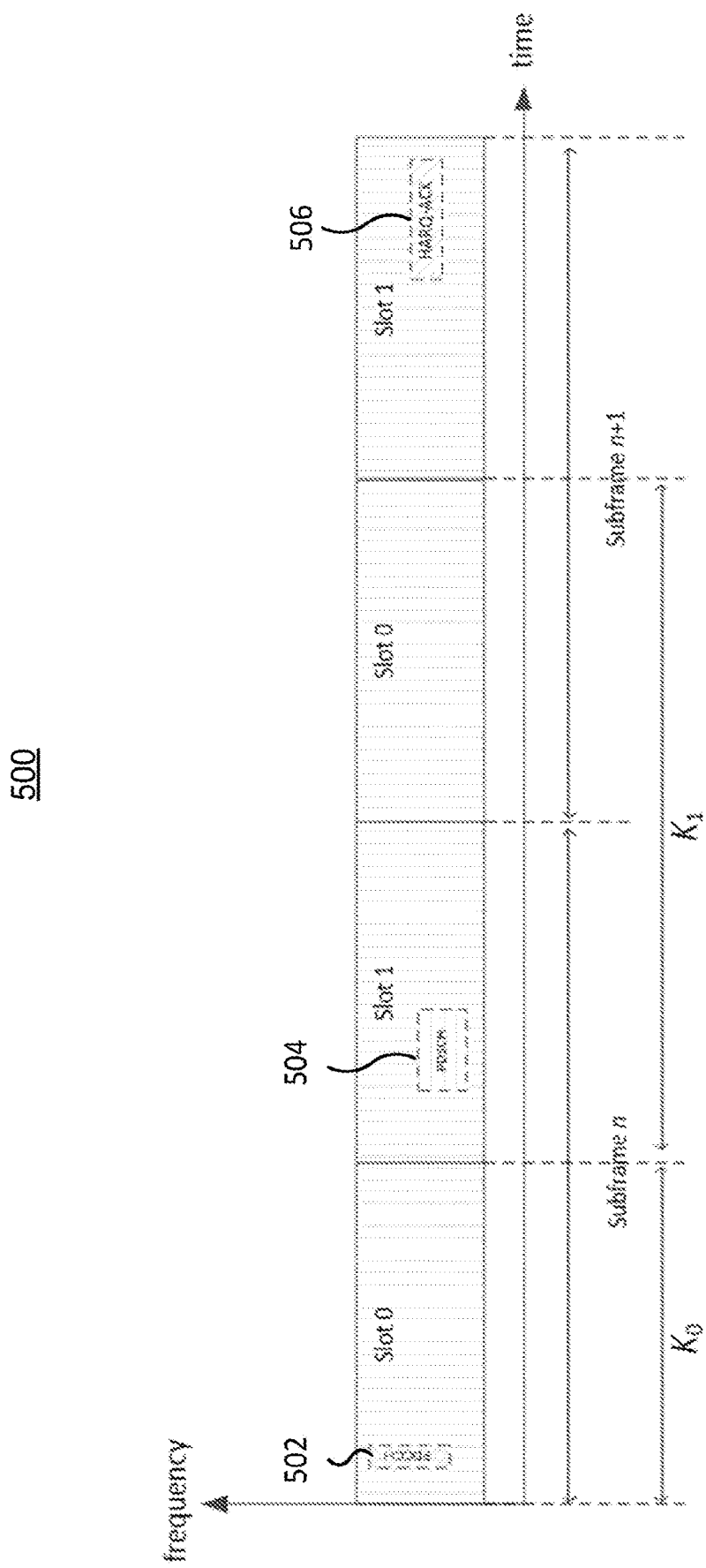
FIG. 5 illustrates a resource allocation of a PDSCH and corresponding HARQ feedback transmission according to an example implementation of the present disclosure.

FIG. 5 illustrates a resource allocation 500 of a PDSCH and corresponding HARQ feedback transmission according to an example implementation of the present disclosure. Two parameters $K_0$ and $K_1$ may be indicated in DCI carried by the PDCCH 502. The parameter $K_0$ may indicate a slot offset between the slot (e.g., slot 0 of subframe n) containing the PDCCH 502 and the slot (e.g., slot 1 of subframe n) containing the PDSCH 504 that is indicated/scheduled by the DCI carried by the PDCCH 502. $K_0=1$ in the example of FIG. 5. On the other hand, the parameter $K_1$ may indicate a slot offset between the slot (e.g., slot 1 of subframe n) containing the PDSCH 504 and the slot (e.g., slot 1 of subframe n+1) in which the UE is instructed by the BS to perform the HARQ feedback transmission for the PDSCH 504 on a UL resource 506 configured by the BS. $K_1=2$ in the example of FIG. 5. The values of the $K_0$ and $K_1$ parameters may be indicated to the UE via DCI. It should be noted that even though each subframe includes only two slots in the implementation illustrated in FIG. 5, any number of slots may be included in one subframe in some other implementations of the present disclosure. In addition, the number of slots contained in each subframe may be dependent on the numerology of the numerology configuration.

Figure 6:
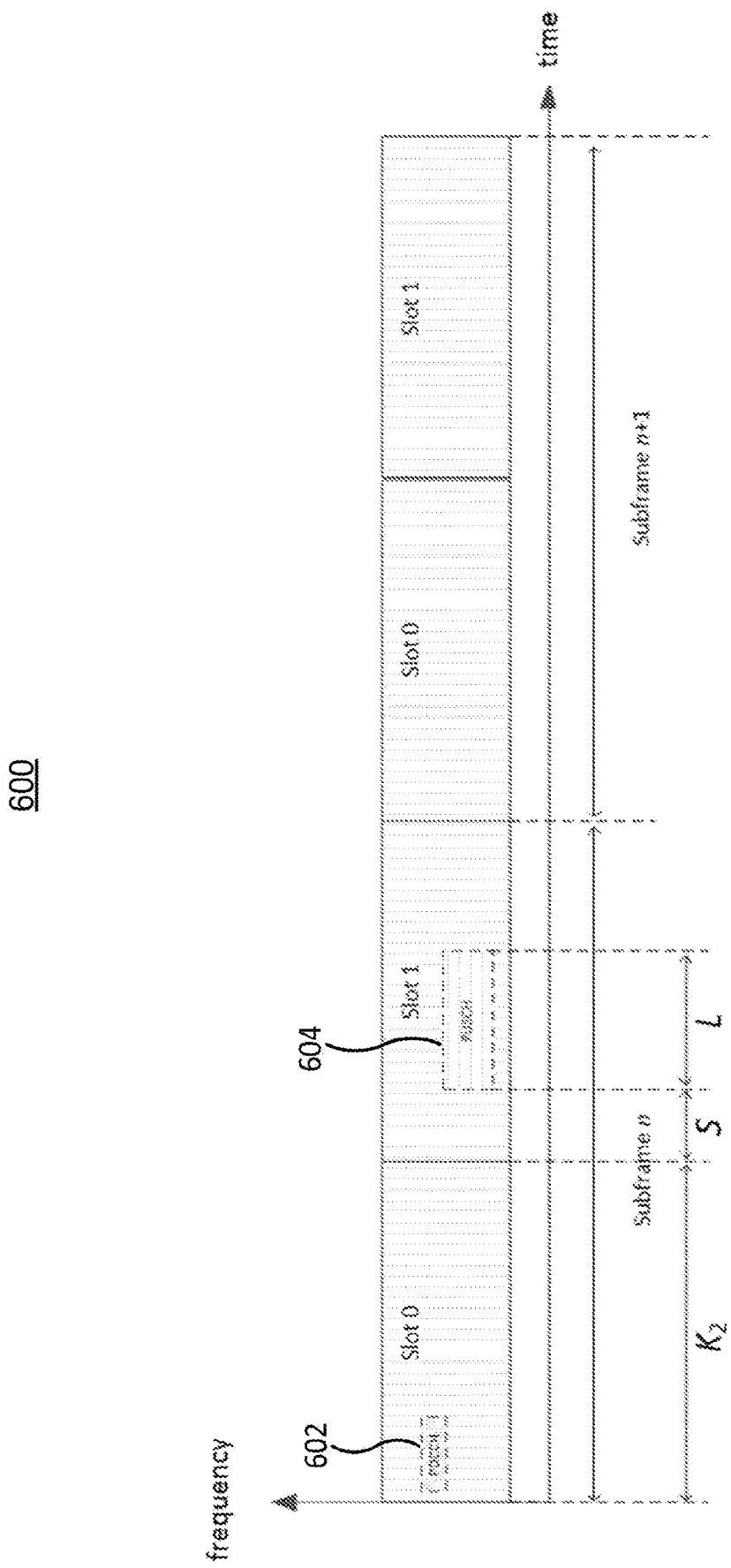
FIG. 6 illustrates a resource allocation of UL data transmission according to an example implementation of the present disclosure.

FIG. 6 illustrates a resource allocation 600 of UL data transmission according to an example implementation of the present disclosure. Three parameters $K_2$, S and L may be indicated in DCI carried by the PDCCH 602. The parameter $K_2$ may indicate a slot offset between the slot containing (e.g., slot 0 of subframe n) the PDCCH 602 and the slot (e.g., slot 1 of subframe n) containing the PUSCH 604 that is scheduled/assigned by the DCI carried by the PDCCH 602. The parameter S may indicate an index for the starting symbol of the PUSCH 604 in the indicated slot (e.g., slot 1 of subframe n). The parameter L may indicate the number of consecutive symbols that the PUSCH 604 occupies in the indicated slot (e.g., slot 1 of subframe n).

The value of the parameters $K_2$, S and L for each dynamic grant may be derived by the UE from some configuration for the numerology of BWPs and a specific index (e.g., time domain resource assignment) contained in the DCI. It should be noted that even though each subframe includes only two slots in the implementation illustrated in FIG. 6, any number of slots may be included in one subframe in some other implementations of the present disclosure. In addition, the number of slots contained in each subframe may be dependent on the numerology of the numerology configuration. In one implementation, a slot may contain a fixed number of symbols.

In the present disclosure, a process corresponding to a PDCCH reception that indicates a PDSCH reception and a HARQ-ACK feedback by the UE may be referred to as a DL process. A process corresponding to a PDCCH reception that indicates a PUSCH transmission by the UE may be referred to as a UL process.

Figure 7:
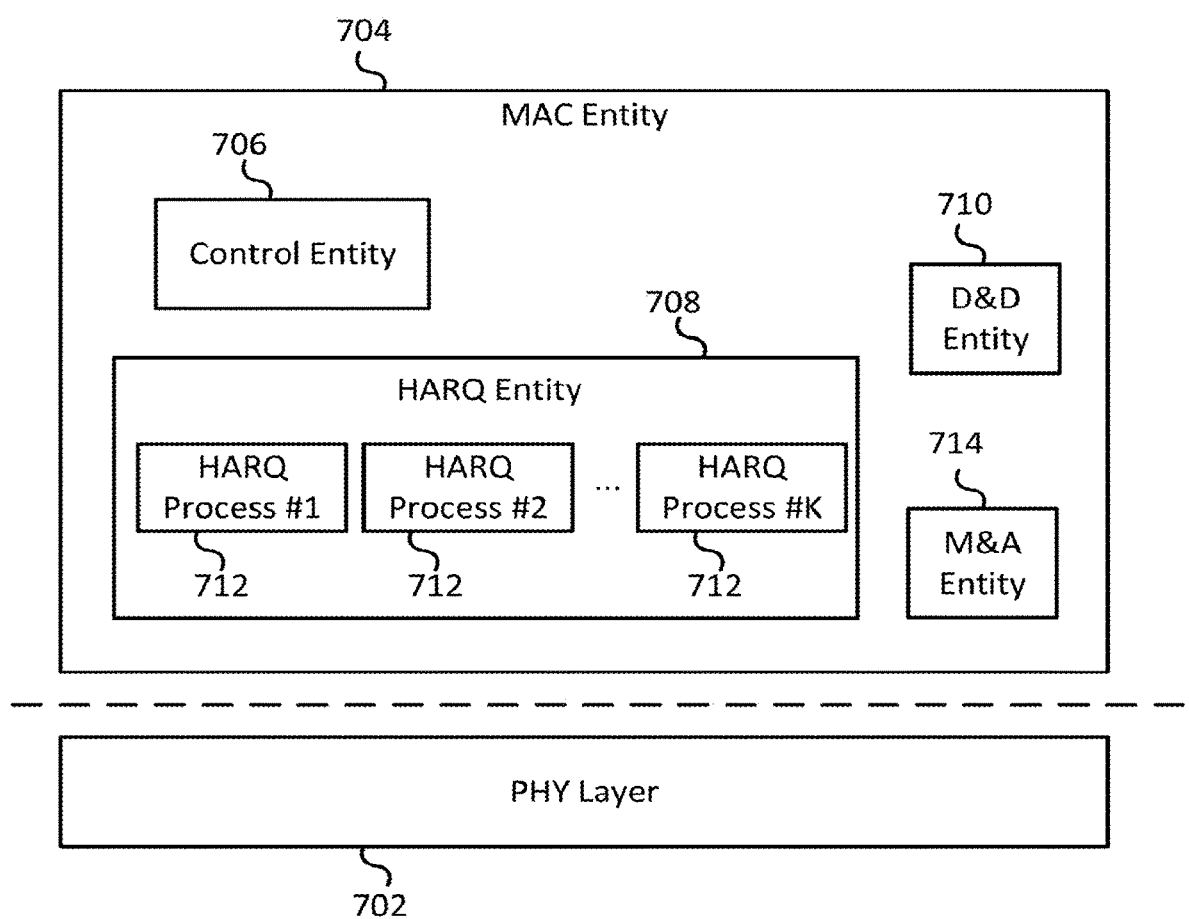
FIG. 7 illustrates an architecture of a protocol stack including a MAC entity and a PHY layer of a UE according to an example implementation of the present application.

FIG. 7 illustrates an architecture 700 of a protocol stack including a MAC entity and a PHY layer of a UE according to an example implementation of the present application. The UE may include a PHY layer 702 and at least one MAC entity 704 that includes a control entity 706, a HARQ entity 708, a Demodulation and Decoding (D&D) entity 710, and a Multiplexing and Assembly (M&A) entity 714. The control entity 706 may represent the MAC entity/layer of the UE except the HARQ entity 708 and the D&D entity 710. The HARQ entity 708 may maintain K HARQ processes 712 (e.g., HARQ processes #1 to HARQ processes #K, where K is a positive integer) with each HARQ process 712 corresponding to a HARQ process ID. The D&D entity 710 may be responsible for disassembling and demultiplexing the received MAC PDU. It should be noted that the terms "HARQ process ID," "HARQ ID," and "HARQ process number" may be interchangeable in some implementations of the present disclosure.

In addition, it should be noted that the implementation in FIG. 7 is for illustrative purposes only and is not meant to limit the scope of the present disclosure. For example, in some other implementations, more or less entities in the UE may be utilized during the DL process or the UL process.

Figure 8:
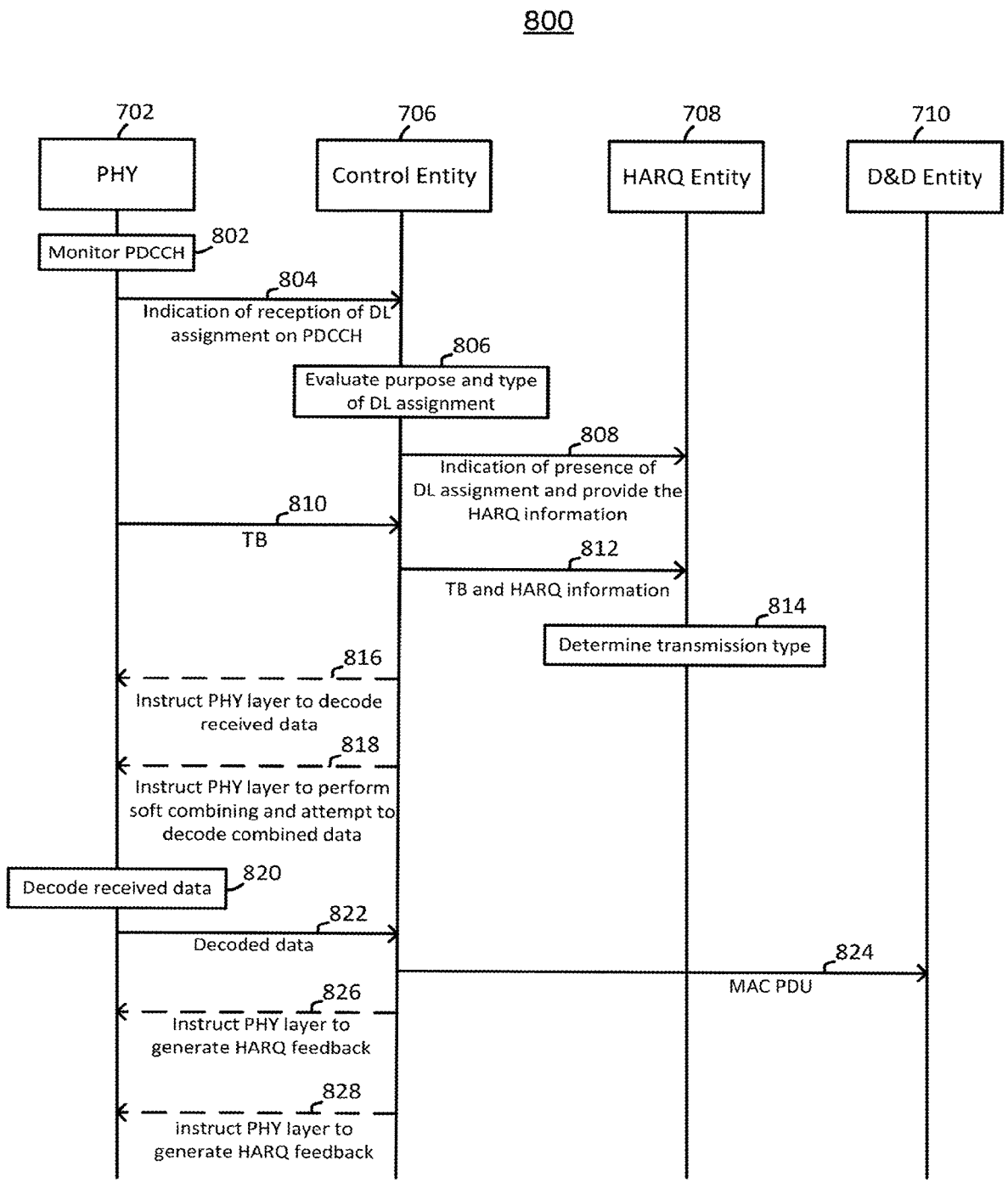
FIG. 8 illustrates a DL process performed by a UE according to an example implementation of the present disclosure.

FIG. 8 illustrates a DL process 800 performed by a UE according to an example implementation of the present disclosure. For the convenience of discussion and illustration, the entities included in the protocol stack of the UE illustrated in FIG. 7 are illustrated in FIG. 8 with the same numerals.

In action 802 (Step 1), the PHY layer 702 of the UE may monitor PDCCH candidates according to the gNB's configuration and thus obtain a DL assignment from a PDCCH by decoding the DCI (e.g., with CRC scrambled by a specific RNTI for the UE on the PDCCH. For example, the specific RNTI may be a C-RNTI. In some implementations, the UE may use the DL assignment to determine the time location of the time slot including the PDSCH and/or the time location of the time slot including the resource for transmitting the HARQ feedback. For example, the DL assignment may include the $K_0$ and $K_1$ parameters.

In action 804 (Step 2), the PHY layer 702 may provide an indication of the reception of the DL assignment on the PDCCH to the MAC layer of the UE (e.g., the control entity 706 of MAC entity 704 illustrated in FIG. 7). In some implementations, the indication of the reception of the DL assignment may include a PDSCH reception assignment and the HARQ information that contains an NDI.

In action 806 (Step 3), the control entity 706 of the UE may evaluate the purpose and type of the DL assignment based on the indication of the reception of the DL assignment from PHY layer 702. For example, the MAC entity may determine whether the DL assignment is for the MAC entity's C-RNTI, and/or whether the NDI has been toggled.

In action 808 (Step 4), the control entity 706 of the UE may inform HARQ entity 708 of the presence of the DL assignment and provide the HARQ information (e.g., including a HARQ process ID) to HARQ entity 708.

In action 810 (Step 5), at a time after the end of the PDSCH reception (e.g., at the end of the last symbol of the PDSCH in the time domain), the PHY layer 702 may provide a TB received on the PDSCH to the MAC layer of the UE (e.g., to the control entity 706 of MAC entity 704).

In action 812 (Step 6), the control entity 706 may provide the TB and the HARQ information that indicates a HARQ process (e.g., the HARQ process 712 illustrated in FIG. 7) to the HARQ entity 708.

In action 814 (Step 7), the HARQ entity 708 may determine the transmission type of the TB (e.g., retransmission or new transmission). For example, when performing the HARQ process, the HARQ entity 708 may determine whether the NDI has been toggled and whether the DL assignment is a new transmission.

If the DL assignment is determined as a new transmission in action 814, then in action 816 (Step 8), the control entity 706 may instruct the PHY layer 702 to decode the received data.

If the DL assignment is determined as a retransmission in action 814 and the received data has not been successfully decoded by the PHY layer 702, then in action 818 (Step 8'), the control entity 706 may instruct the PHY layer 702 to perform a soft combining process in which the PHY layer 702 may combine the received data with the data currently stored in a soft buffer for this TB and then attempt to decode the combined data.

In action 820 (Step 9), the PHY layer 702 may decode the received data according to the instruction from the control entity 706, and in action 822, provide the decoded data to the MAC layer of the UE (e.g., the control entity 706).

In action 824 (Step 10), if the received data is successfully decoded in action 820 (Step 9), the MAC layer of the UE (e.g., the control entity 706) may provide the MAC PDU corresponding to the decoded data to the D&D entity 710. For example, the D&D entity 710 may disassemble and demultiplex the MAC PDU.

In addition, if the received data is successfully decoded in action 820, the MAC layer of the UE (e.g., the control entity 706) may further instruct the PHY layer 702 to generate the HARQ feedback (e.g., an ACK/Negative Acknowledgement (NACK)) of the received data in this TB in action 826 (Step 11).

Conversely, if the received data is not successfully decoded in action 820, the MAC layer of the UE (e.g., the control entity 706) may instruct the PHY layer 702 to replace the data stored in the soft buffer with the data that the MAC entity instructs PHY layer 702 to decode. Then, the MAC layer of the UE (e.g., the control entity 706) may instruct the PHY layer 702 to generate the HARQ feedback of the data in this TB in action 828 (Step 11').

It should be noted that although actions 802, 804, 806, 808, 810, 812, 814, 816, 818, 820, 822, 824, 826 and 828 are indicated as separate actions in FIG. 8, these separately indicated actions should not be construed as necessarily order dependent. The order in which the actions are performed in FIG. 8 is not intended to be construed as a limitation, and any number of the disclosed actions may be combined in any order to implement the method, or an alternate method. Moreover, one or more of actions 802, 804, 806, 808, 810, 812, 814, 816, 818, 820, 822, 824, 826 and 828 in the DL process may be omitted in some of the present implementations. For example, action 810 (Step 5) may be combined with, or merged into, action 804 (Step 2). In this condition, the PHY layer of the UE may deliver/provide the DL assignment and the corresponding HARQ information, as well as the received TB, to the MAC entity after the UE receives the PDSCH.

Figure 9:
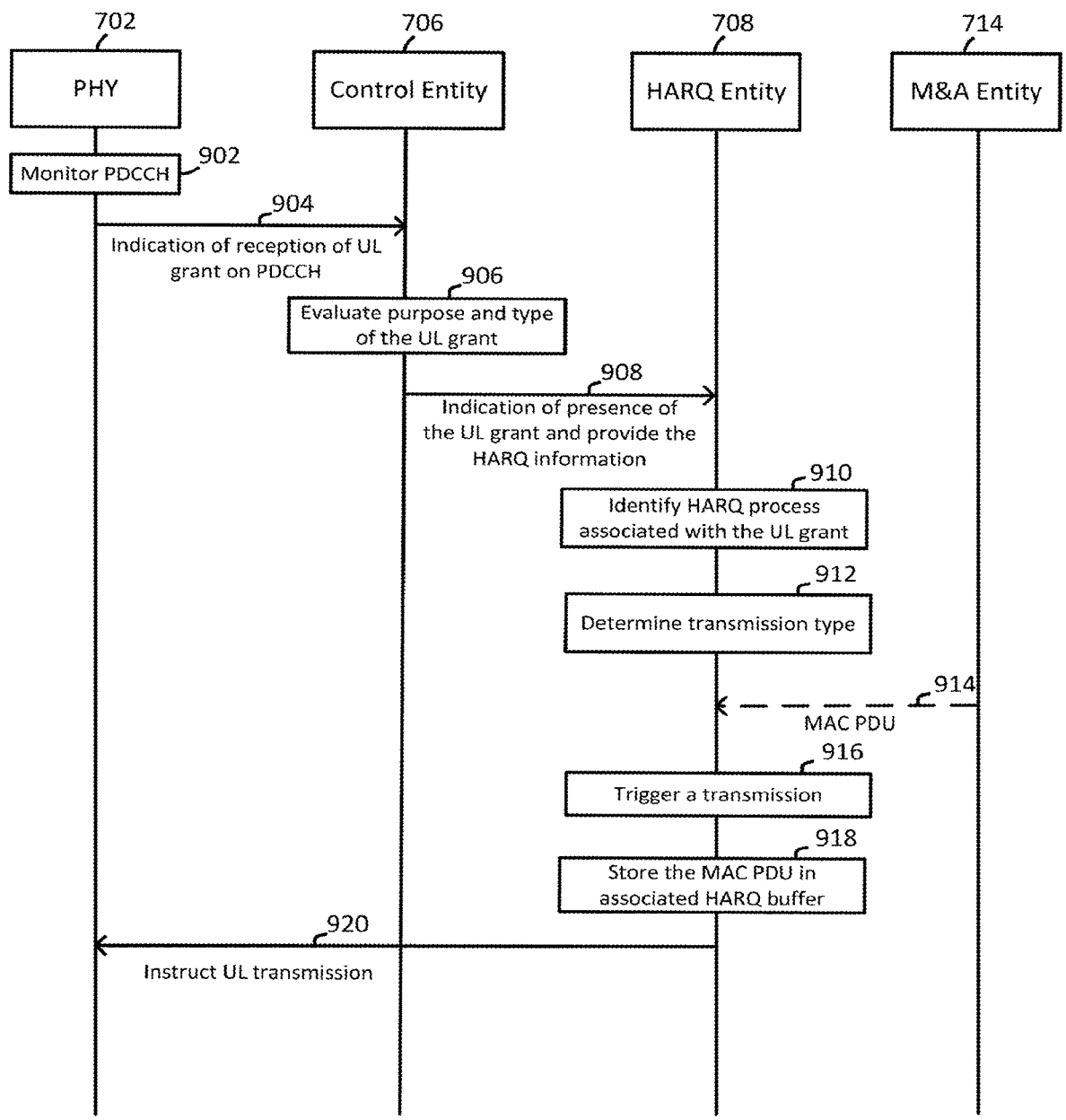
FIG. 9 illustrates a UL process performed by a UE according to an example implementation of the present disclosure.

FIG. 9 illustrates a UL process 900 performed by a UE according to an example implementation of the present disclosure. For the convenience of discussion and illustration, the entities included in the protocol stack of the UE illustrated in FIG. 7 are illustrated in FIG. 9 with the same numerals.

In action 902, the PHY layer 702 of the UE may monitor PDCCH candidates according to the gNB's configuration and thus receive a UL grant on the PDCCH by decoding the DCI (e.g., with CRC scrambled by a specific RNTI for the UE on the PDCCH. For example, the specific RNTI may be a C-RNTI.

In action 904, the PHY layer 702 may provide an indication of the reception of the UL grant on the PDCCH to the MAC layer of the UE (e.g., the control entity 706 of MAC entity 704 illustrated in FIG. 7). In some implementations, the indication of the reception of the UL grant may include PUSCH resource information and HARQ information that includes an NDI.

In action 906, the control entity 706 of the UE may evaluate the purpose and type of the UL grant based on the indication of the reception of the UL grant from PHY layer 702. For example, the MAC entity may determine whether the UL grant is for the MAC entity's C-RNTI, a temporary C-RNTI, or CS-RNTI. The MAC entity may also determine whether the NDI has been toggled.

In action 908, the control entity 706 of the UE may inform HARQ entity 708 of the presence of the UL grant and provide the HARQ information (e.g., including a HARQ process ID) to HARQ entity 708.

In action 910, the HARQ entity 708 may identify the HARQ process associated with the UL grant.

In action 912, the HARQ entity 708 may determine the transmission type of the UL transmission (e.g., retransmission or new transmission) by evaluating whether the NDI of the UL grant has been toggled compared with the NDI in a previous transmission of the TB of the identified HARQ process.

If the evaluation in action 912 indicates that the NDI has been toggled, in action 914, the HARQ entity 708 may obtain a MAC PDU to transmit from the M&A entity 714.

In action 916, after obtaining the MAC PDU, the HARQ entity 708 may deliver the MAC PDU and the UL grant and the HARQ information of the TB to the identified HARQ process (e.g., the HARQ process 712 illustrated in FIG. 7), and the HARQ entity 708 may instruct the identified HARQ process to trigger a new transmission.

If the evaluation in action 912 indicates that the NDI has not been toggled (i.e., non-toggled), the HARQ entity 708 may either ignore the UL grant (e.g., no data needed to be transmitted) or deliver the UL grant and the HARQ information (redundancy version) of the TB to the identified HARQ process (e.g., the HARQ process 712 illustrated in FIG. 7) and instruct the identified HARQ process to trigger a retransmission in action 916.

In action 918, the identified HARQ process (e.g., the HARQ process 712 illustrated in FIG. 7) may store the MAC PDU in an associated HARQ buffer. The identified HARQ process may also store the UL grant received from the HARQ entity 708 and then generate a transmission.

In action 920, the identified HARQ process may instruct the PHY layer 702 to generate a transmission according to the stored UL grant.

It should be noted that although actions 902, 904, 906, 908, 910, 912, 914, 916, 918 and 920 are indicated as separate actions in FIG. 9, these separately indicated actions should not be construed as necessarily order dependent. The order in which the actions are performed in FIG. 9 is not intended to be construed as a limitation, and any number of the disclosed actions may be combined in any order to implement the method, or an alternate method. Moreover, one or more of actions 902, 904, 906, 908, 910, 912, 914, 916, 918 and 920 in the UL process may be omitted in some of the present implementations.

In one implementation, a MAC entity may include a HARQ entity for each serving cell. The HARQ entity may maintain multiple HARQ processes in parallel. Each HARQ process may be associated with a HARQ process ID. For UL, a predefined number (e.g., 16) of HARQ processes per cell is supported by the UE. For DL, a maximum of 16 HARQ processes per cell is supported by the UE. The number of HARQ processes that the UE may use for DL may be configured to the UE for each cell separately (also referred to as per cell configuration) via a higher layer (e.g., RRC layer) parameter nrofHARQ-ProcessesForPDSCH. In one implementation, the UE may assume a predefined number or a default number (e.g., 8) of HARQ processes for DL when no configuration is provided.

The HARQ entity may provide HARQ information and associated TBs received on the DL-SCH to the corresponding HARQ processes. A dedicated broadcast HARQ process may be used for a broadcast control channel (BCCH). In one implementation, the HARQ process may support one TB when the PHY layer is not configured for DL spatial multiplexing. In one implementation, the HARQ process may support one or two TBs when the PHY layer is configured for DL spatial multiplexing.

In one implementation, a MAC entity of the UE may include a HARQ entity for each serving cell with configured UL carrier (including the case when it is configured with supplementary UL carrier). The HARQ entity may maintain multiple HARQ processes in parallel. The number of parallel UL HARQ processes per HARQ entity may either predefined in the 3GPP TS or preconfigured by the gNB per cell group via a DL RRC message. Each HARQ process may support one TB transmission.

It should be noted that the HARQ process ID of a DL assignment or the HARQ process ID of a UL grant may be indicated via a HARQ process number field in the DCI. In one implementation, the HARQ process number field may have a fixed bit length. For example, the HARQ process number field has 4 bits. The HARQ process number field set to "0000" may indicate the HARQ process #0, the HARQ process number field set to "0001" may indicate the HARQ process #1, and so on.

In one implementation, a UE may support multiple types of DCI formats. Each DCI format may be mapped to a different usage, such as scheduling a data transmission on a PUSCH in one cell, scheduling a data reception on a PDSCH in one cell, etc. In one implementation, one or more new DCI format may be for a specific purpose or application. For example, a compact DCI format may be for the URLLC service. In one implementation, the compact DCI format may have a different format than an existing DCI format, including DCI format 0_0, 0_1, 1_0 and 1_1. The HARQ process number field in the compact DCI format may have a fixed bit length or a variable bit length. The bit length of the HARQ process number field may be predefined in the 3GPP TS or preconfigured by the BS via a DL RRC message. In one implementation, the bit length of the HARQ process number field may be per UE, per serving cell group, per serving cell, per DL BWP, or per UL BWP configured by the BS. In one implementation, the bit length of the HARQ process number field may be per UE, per cell group, per cell, per DL BWP, or per UL BWP predefined in the 3GPP TS.

In one implementation, the HARQ process number field in a specific DCI format (e.g., a compact DCI format) for the URLLC service may have a variable bit length. The bit length of the HARQ process number field in the specific DCI format may be configured via a DL RRC message. The HARQ process number field in other DCI formats (such as DCI format 0_1 for scheduling of PUSCH, DCI format 1_1 for scheduling of PDSCH) may have a fixed bit length.

Figure 10:
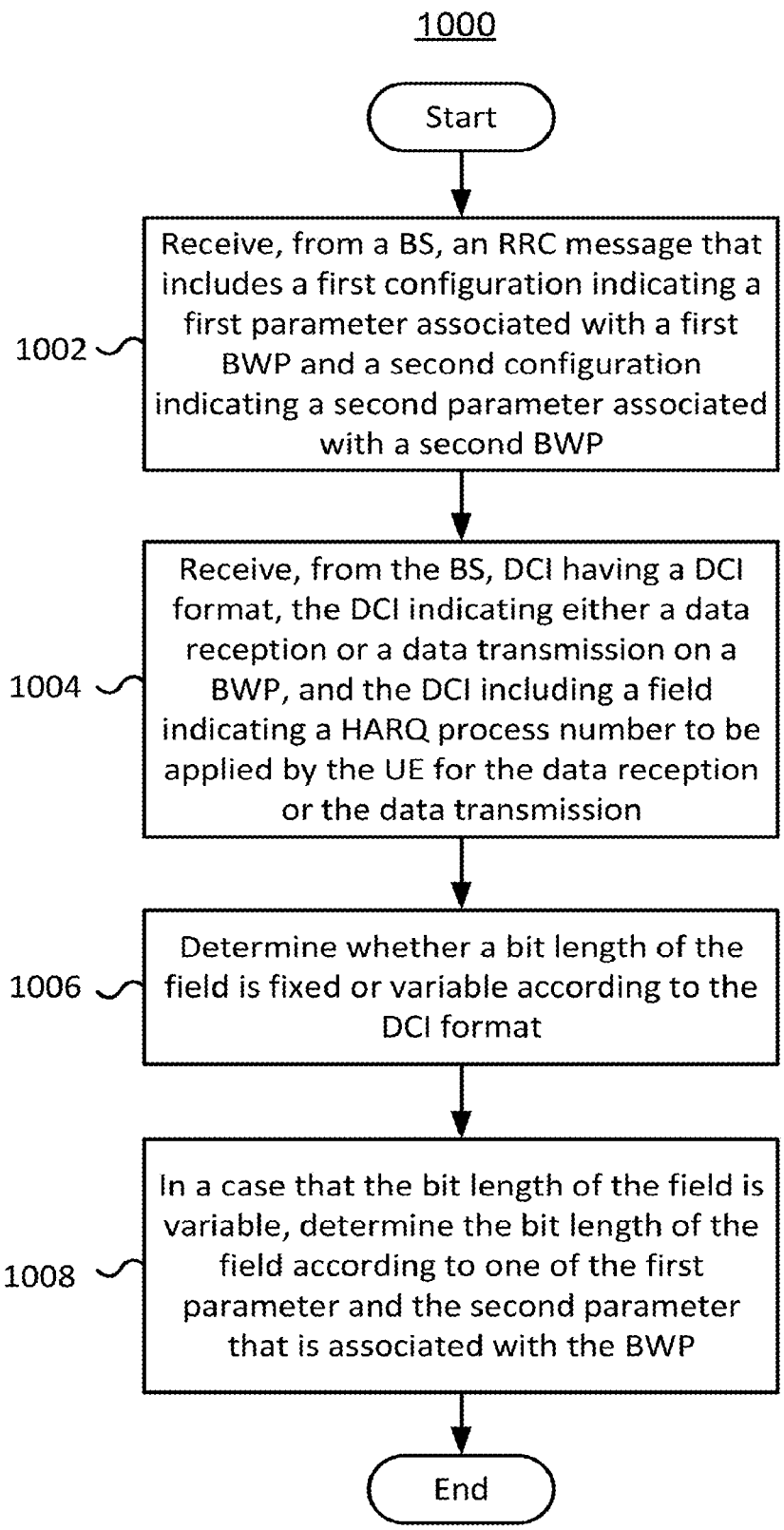
FIG. 10 illustrates a method performed by a UE for receiving DCI according to an example implementation of the present disclosure.

FIG. 10 illustrates a method 1000 performed by a UE for receiving DCI according to an example implementation of the present disclosure. In action 1002, the UE may receive, from a BS, an RRC message that includes a first configuration indicating a first parameter associated with a first BWP and a second configuration indicating a second parameter associated with a second BWP. For example, the first parameter may indicate a first bit length of the HARQ process number field in the specific DCI format for scheduling data reception/transmission in the first BWP. The second parameter may indicate a second bit length of the HARQ process number field in the specific DCI format for scheduling data reception/transmission in the second BWP. The first parameter and the second parameter may be the same or different. The first configuration and the second configuration may be associated with the first BWP and the second BWP, respectively.

In one implementation, the RRC message may be one of an RRCReconfiguration message, an RRCResume message, an RRCReestablishment message, an RRCSetup message, and a DL unicast RRC message. In one implementation, the first configuration or the second configuration may be one of a BWP-UplinkDedicated IE and a PUSCH-Config IE. In one implementation, the first configuration or the second configuration may be one of a BWP-UplinkDedicated IE and a PUSCH-Config IE.

In action 1004, the UE may receive, from the BS, DCI having a DCI format. The DCI indicates either a data reception or a data transmission on a BWP. The DCI includes a field indicating a HARQ process number (e.g., the HARQ process number field) to be applied by the UE for the data reception or the data transmission. In action 1006, the UE may determine whether a bit length of the field (e.g., the HARQ process number field) is fixed or variable according to the DCI format. For example, the bit length of the field is variable when the DCI has the specific DCI format (e.g., the compact DCI format for the URLLC service); otherwise (e.g., DCI format 0_0, 0_1, 1_0 and 1_1) the bit length of the field is fixed.

In action 1008, in a case that the bit length of the field (e.g., the HARQ process number field) is variable, the UE may determine the bit length of the field according to one of the first parameter and the second parameter that is associated with the BWP. For example, after the UE determines the bit length of the field (e.g., the HARQ process number field) is variable in action 1006, the bit length of the field may be indicated by the first parameter if the DCI schedules the data reception/transmission on the first BWP, and the bit length of the field may be indicated by the second parameter if the DCI schedules the data reception/transmission on the second BWP.

In one implementation, in a case that the bit length of the field (e.g., the HARQ process number field) is variable, the UE may determine the bit length of the field according to one of the first parameter and the second parameter that is associated with a BWP on which the DCI is received in action 1004. For example, if the UE receives the DCI on a DL BWP #1 in action 1004, the UE may determine the bit length of the field according to one of the first parameter and the second parameter that is associated with the DL BWP #1, irrespective of the BWP on which the data reception/transmission is.

In one implementation, the bit length of the HARQ process number field may be configured per BWP. The UE may be configured with multiple UL BWPs (e.g., UL BWP #0—UL BWP #3) and/or multiple DL BWPs (e.g., DL BWP #0—DL BWP #3) in a serving cell. In one implementation, the first BWP and the second BWP may be different DL BWPs. For example, the bit length of the HARQ process number field determined according to a first configuration for DL BWP #1 may be different from the bit length of the HARQ process number field determined according to a second configuration for DL BWP #2. In one implementation, the first BWP and the second BWP may be different UL BWPs. For example, the bit length of the HARQ process number field determined according to a third configuration for UL BWP #2 may be different from the bit length of the HARQ process number field determined according to a fourth configuration for UL BWP #3. In one implementation, the first BWP may be a DL BWP and the second BWP may be a UL BWP. For example, the bit length of the HARQ process number field determined according to a fifth configuration for DL BWP #3 may be different from the bit length of the HARQ process number field determined according to a sixth configuration for UL BWP #1. In one implementation, the first BWP and the second BWP are in the same cell, which may be the serving cell configured with the multiple UL BWPs and/or the multiple DL BWPs.

In one implementation, the bit length of the HARQ process number field may be determined according to individual configurations that are configured per cell. For example, the configuration for the determination of the bit length of the HARQ process number field for a first cell may be different from the configuration for the determination of the bit length of the HARQ process number field for a second cell. Referring to the method 1000 illustrated in FIG. 10, the first BWP may be in the first cell, and the second BWP may be in the second cell different from the first cell.

Case 3: Mapping Between the HARQ Process Number Field and the HARQ Process ID

There are multiple implementations regarding how the HARQ process number field in the compact DCI format indicates to the UE the HARQ process number. For example, the bit length of the HARQ process number field is 2, but the UE may support 16 HARQ processes (4 bits needed). Implementations regarding which HARQ process number is indicated by the value of the HARQ process number field are as follows. It should be noted that in the following implementations, the bit length of the HARQ process number field is set to 2 and the number of HARQ processes for both DL and UL is set to 16 as an example. Implementations below are related to a gNB indicating either a DL or UL HARQ process number via the HARQ process number field in the compact DCI. The UE may determine a HARQ process ID when receiving the compact DCI format (on the PDCCH) based on one or more implementations as follows.

Case 3-1: A HARQ process ID offset (e.g., CompactDCIOffset) may be provided to the UE via a newly disclosed RRC IE.

In one implementation, the CompactDCIOffset may be per HARQ process number configured by the gNB. For example, different values of the HARQ process number field may apply respective configured offset (e.g., CompactDCIOffset). In one implementation, the HARQ process ID offset may indicate a difference between the value of the HARQ process number field and the HARQ process ID.

An explicit indicator may be contained in the compact DCI (e.g., 1-bit indicator). The indicator may be used to activate/deactivate the application of the HARQ process ID offset. In one implementation, the HARQ process ID offset may be configured via an RRC message but activated/deactivated via DCI.

An implicit indicator contained in the compact DCI may be used to activate/deactivate the application of the HARQ process ID offset. For example, if the value of the HARQ process number field is higher than a threshold, the HARQ process ID offset may be activated. The threshold may be predefined in the 3GPP TS and/or indicated by a parameter nrofHARQ-Processes as disclosed in the 3GPP TS 38.331. The parameter nrofHARQ-Processes may be the number of HARQ processes reserved/configured (by the gNB) for both Type 1 and Type 2 configured grant configuration.

Case 3-2: The CompactDCIOffset may be configured by the gNB per UE, per serving cell group, per serving cell, per DL BWP or per UL BWP. In one implementation, the CompactDCIOffSet is configured by the gNB per serving cell. In this case, the HARQ process ID applied to the DL scheduling (or PDSCH reception) or the UL grant (or PUSCH transmission) indicated by the compact DCI may be based on (a) the HARQ process number field in the compact DCI and (b) the CompactDCIOffset configured for the serving cell in which the DCI is received, the serving cell in which the corresponding PUSCH transmission takes place, or the serving cell in which the corresponding PDSCH reception takes place.

Case 3-3: In one implementation, the HARQ process ID may be the value of the CompactDCIOffset plus the value of the HARQ process number field. For example, if CompactDCIOffset is configured as 4 and the value of the HARQ process number field is set to 0 (e.g., "00"), the HARQ process ID may be set to 4 (4+0). If CompactDCIOffset is configured as 4 and the value of the HARQ process number field is set to 1 (e.g., "01"), the HARQ process ID may be set to 5 (4+1).

Case 3-4: In one implementation, the HARQ process ID offset may not be a newly disclosed parameter. For example, the HARQ process ID offset may be (set to) the parameter nrofHARQ-Processes as disclosed in the 3GPP TS 38.331. The parameter nrofHARQ-Processes may indicate the number of HARQ processes reserved/configured (by the gNB) for both Type 1 and Type 2 configured grant configuration.

Case 3-5: Case 3-5 is similar to (or based on) Case 3-4. When there are multiple activated configured grant configurations within one serving cell, the HARQ process ID offset may be (set to) a parameter nrofHARQ-Processes configured for one specific configured grant configuration. In one implementation, the specific configured grant configuration may be a configured grant configuration that has the minimal configuration index (e.g., numbering, the value of the parameter nrofHARQ-Processes) or the maximal configuration index. For example, there are two configured grant configurations, including configured grant configuration #1 and configured grant configuration #2, configured by the gNB to the UE within a serving cell. The configured grant configuration #1 and #2 are configured with nrofHARQ-Processes as X and Y, respectively. The HARQ process ID offset may be set to X if X is larger than Y. The HARQ process ID offset may be set to Y if X is smaller than Y. In another implementation, the specific configured grant configuration may be a configured grant configuration that is currently activated and has either the minimal configuration index or the maximal configuration index. For example, there are three configured grant configurations, including configured grant configuration #1, configured grant configuration #2 and configured grant configuration #3, configured by the gNB to the UE within a serving cell. The configured grant configuration #1, #2 and #3 are configured with nrofHARQ-Processes as X, Y and Z, respectively. When only the configured grant configurations #1 and #3 are activated (configuration #2 is deactivated), the HARQ process ID offset may be set to X if X is larger than Z. The HARQ process ID offset may be set to Z if X is smaller than Z.

Case 3-6: The HARQ process ID may be "the value of the number of HARQ processes supported by the UE" minus "the value of the HARQ process number field." For example, if the value of the number of HARQ process supported by the UE is 16 and the value of the HARQ process number field is set to 0 (e.g., "00"), the HARQ process ID may be set to 16 (16-0). If the value of the number of HARQ process supported by the UE is 16 and the value of the HARQ process number field is set to 1 (e.g., "01"), the HARQ process ID may be set to 15 (16-1).

Case 3-7: A list of HARQ process IDs may be preconfigured by the gNB via a DL RRC message. The list of HARQ process IDs may be configured by the gNB per UE, per serving cell group, per serving cell, per DL BWP or per UL BWP. The configured list of the HARQ process IDs may contain zero, one or multiple entries. Each entry in the configured list may indicate a value that indicates a HARQ process ID assigned by the gNB to the UE for a corresponding HARQ process. For example, when the UE receives a compact DCI with the HARQ process number field having a value x, the UE may apply the $x^{th}$ entry in the configured list of HARQ process IDs.

Case 3-8: Similar to Case 3-7. When the UE receives a compact DCI on a first DL BWP that indicates UL transmission on a first UL BWP or DL reception on a second DL BWP and the HARQ process number field of the received DCI has a value x, the UE may apply the $x^{th}$ entry in a specific list of HARQ process IDs. The specific list may be the list of HARQ process IDs configured for the first DL BWP, the second DL BWP or the first UL BWP.

Case 3-9: A UE may be configured with a specific IE, e.g., via DL RRC configuration. The specific IE may configure the UE with a set of HARQ process IDs used for the compact DCI. For example, the set may include HARQ process #12, HARQ process #13, HARQ process #14, and HARQ process #15. If the HARQ process number field in the compact DCI has 2 bits and has a value of '0', the UE may use the HARQ process #12 for this scheduling. If the HARQ process number field in the compact DCI has a value of '1', the UE may use the HARQ process #13 for this scheduling. Similarly, the value 2 and the value 3 of the HARQ process number field correspond to the HARQ process #14 and #15, respectively. In one implementation, the NW may configure different sets of HARQ process IDs for different types of compact DCI. In one implementation, the NW (e.g., gNB) may configure different sets of HARQ process IDs for compact DCI formats having different sizes of the HARQ process number field.

All implementations in the present disclosure are not limited to application to address the problem identified in the present disclosure. For example, the disclosed implementations may be applied to solve any problem existing in a RAN of a cellular wireless communication system.

All the numbers in the implementations in the present disclosure are just exemplary rather than limiting. The numbers are provided as an example to better illustrate how the method is executed.

The DL RRC message in the present disclosure may be RRCReconfiguration, RRCResume, RRCReestablishment, RRCSetup or any other DL unicast RRC message.

The expression "a specific configuration is configured per UE" or "a specific configuration is provided to a UE" in the present disclosure may mean that the specific configuration may be provided via a DL RRC message.

The expression "a specific configuration is configured per cell group" or "a specific configuration is provided to a cell group" in the present disclosure may mean that the specific configuration may be provided via a CellGroupConfig, MAC-CellGroupConfig or PhysicalCellGroupConfig IE.

The expression "a specific configuration is configured per serving cell" or "a specific configuration is provided to a serving cell" in the present disclosure may mean that the specific configuration may be provided via a ServingCellConfigCommon, ServingCellConfig, PUSCH-ServingCellConfig or PDSCH-ServingCellConfig IE.

The expression "a specific configuration is configured per UL BWP or per BWP" or "a specific configuration is provided via a UL BWP or for a BWP" in the present disclosure may mean that the specific configuration may be provided via a BWP-Uplink, BWP-UplinkDedicated, BWP-UplinkCommon, PUSCH-ConfigCommon or PUSCH-Config IE.

The expression "a specific configuration is configured per DL BWP or per BWP" or "a specific configuration is provided via a DL BWP or a BWP" in the present disclosure may mean that the specific configuration may be provided via a BWP-Downlink, BWP-DownlinkDedicated, BWP-DownlinkCommon, PDSCH-ConfigCommon or PDSCH-Config IE.

The term "transmitted" used in the previously disclosed implementations may mean that transmission of a corresponding MAC CE/MAC PDU/layer 1 signaling/higher layer signaling is started, is completely transmitted, or is already delivered to a corresponding HARQ process/buffer for transmission. The term "transmitted" used in the previously disclosed implementations may also mean that the HARQ_ACK feedback (response from gNB) of the MAC PDU carrying the MAC CE/MAC PDU/layer 1 signaling/higher layer signaling is received. The term "transmitted" used in the previously disclosed implementations may also mean that a corresponding MAC CE/MAC PDU is built.

The "HARQ_ACK feedback" may be implemented as a DCI format 0_0, DCI format 0_1 or some other DCI formats received by the UE from the gNB on PDCCH. The received DCI includes an NDI set to a specific value (e.g., set to 1) and the DCI also indicates a HARQ process ID that is the same as a HARQ process ID applied by/indicated to be used for the HARQ process of the MAC PDU transmission.

The PDCCH in the present disclosure is transmitted by the gNB to the UE. The PDCCH is received by the UE from the gNB. The PDSCH in the present disclosure is transmitted by the gNB to the UE. The PDSCH is received by the UE from the gNB. The PUSCH in the present disclosure is transmitted by the UE to the gNB. The PUSCH is received by the gNB from the UE.

A PDCCH/PDSCH/PUSCH transmission may span multiple symbols in the time domain. A time duration of a PDSCH/PDSCH/PUSCH (transmission) may represent a time interval that starts from the beginning of the first symbol of the PDSCH/PDSCH/PUSCH (transmission) and ends at the end of the last symbol of the PDSCH/PDSCH/PUSCH (transmission).

The term "A and/or B" in the present disclosure means "A", "B" or "A and B". The term "A and/or B and/or C" within the present disclosure means "A", "B", "C", "A and B", "A and C", "B and C" or "A and B and C".

The term "A/B" in the present disclosure means "A" or "B".

The term "instruct the PHY to generate acknowledgement" may have the same meaning as "instruct the PHY to perform HARQ-ACK feedback" in the present disclosure.

The term "acknowledgement" may have the same meaning as "HARQ-ACK" or "HARQ-ACK feedback" in the present disclosure.

The term "repetition of a TB" may have the same meaning as "repetition of a PUSCH", and the term "a TB repetition" may have the same meaning as "a PUSCH repetition".

The expression "the UE may not need to perform the corresponding HARQ feedback" in the present disclosure may have the same meaning as "the HARQ entity/HARQ process may not need to perform the corresponding HARQ feedback".

In the present disclosure, the term "by specific Physical layer signaling" may include at least one of, but not limited to, by a specific format of DCI; by a specific field of DCI; by a specific field of DCI, and the field is set to a specific value or by DCI with CRC bits scrambled with a specific RNTI.

In the present disclosure, "a MAC timer" may be configured by RRC that is indicated by the gNB. The UE may be configured with an initial value of the timer. The unit of the initial value may be frame/sub-frame/millisecond/sub-millisecond/slot/symbol. The timer may be started and/or restarted by the UE (e.g., the MAC entity of the UE). The timer may be started and/or restarted by the UE (e.g., the MAC entity of the UE) when a specific condition is satisfied.

Figure 11:
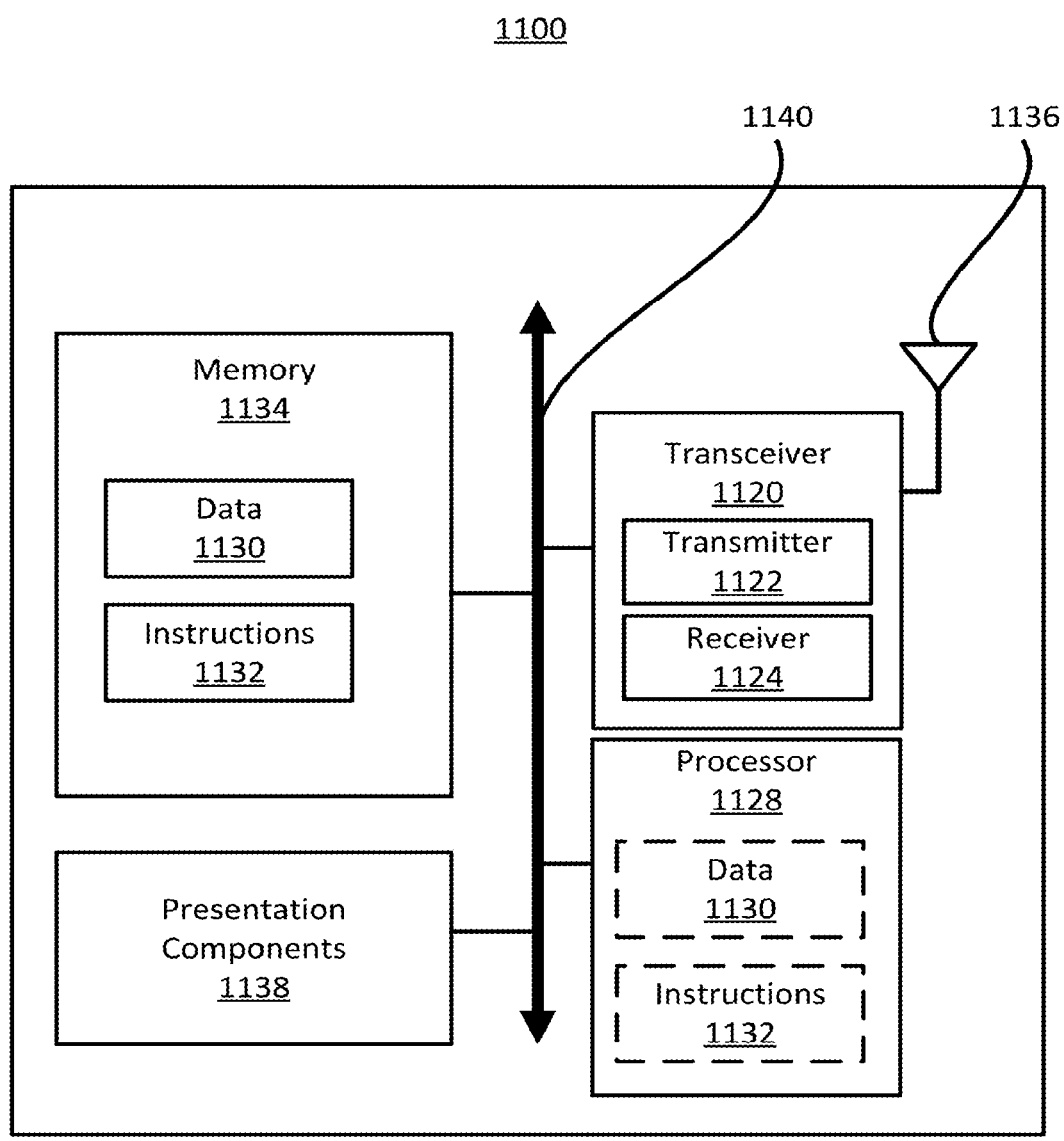
FIG. 11 is a block diagram illustrating a node for wireless communication according to an example implementation of the present disclosure.

FIG. 11 is a block diagram illustrating a node 1100 for wireless communication according to an example implementation of the present disclosure. As illustrated in FIG. 11, node 1100 may include a transceiver 1120, a processor 1128, a memory 1134, one or more presentation components 1138, and at least one antenna 1136. The node 1100 may also include a radio frequency (RF) spectrum band module, a BS communications module, a network communications module, and a system communications management module, Input/Output (I/O) ports, I/O components, and a power supply (not illustrated in FIG. 11).

Each of the components may directly or indirectly communicate with each other over one or more buses 1140. The node 1100 may be a UE or a BS that performs various functions disclosed with reference to FIGS. 1 through 10.

The transceiver 1120 has a transmitter 1122 (e.g., transmitting/transmission circuitry) and a receiver 1124 (e.g., receiving/reception circuitry) and may be configured to transmit and/or receive time and/or frequency resource partitioning information. The transceiver 1120 may be configured to transmit in different types of subframes and slots including but not limited to usable, non-usable and flexibly usable subframes and slot formats. The transceiver 1120 may be configured to receive data and control channels.

The node 1100 may include a variety of computer-readable media. Computer-readable media may be any available media that may be accessed by the node 1100 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 1134 may include computer-storage media in the form of volatile and/or non-volatile memory. The memory 1134 may be removable, non-removable, or a combination thereof. Example memory may include solid-state memory, hard drives, optical-disc drives, etc. As illustrated in FIG. 11, the memory 1134 may store computer-readable, computer-executable instructions 1132 (e.g., software codes) that are configured to cause the processor 1128 to perform various functions disclosed herein, for example, with reference to FIGS. 1 through 10. Alternatively, the instructions 1132 may not be directly executable by the processor 1128 but be configured to cause the node 1100 (e.g., when compiled and executed) to perform various functions disclosed herein.

The processor 1128 (e.g., having processing circuitry) may include an intelligent hardware device, e.g., a Central Processing Unit (CPU), a microcontroller, an ASIC, etc. The processor 1128 may include memory. The processor 1128 may process the data 1130 and the instructions 1132 received from the memory 1134, and information transmitted and received via the transceiver 1120, the base band communications module, and/or the network communications module. The processor 1128 may also process information to be sent to the transceiver 1120 for transmission via the antenna 1136 to the network communications module for transmission to a core network.

One or more presentation components 1138 may present data indications to a person or another device. Examples of presentation components 1138 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
one or more non-transitory computer-readable media containing computer-executable instructions embodied therein; and
at least one processor coupled to the one or more non-transitory computer-readable media, the at least one processor configured to execute the computer-executable instructions to:
receive, from a base station (BS), a radio resource control (RRC) message comprising a Packet Data Convergence Protocol (PDCP) configuration for a PDCP entity, the PDCP entity configured for being associated with more than two Radio Link Control (RLC) entities for Combine-Duplication, a combination of Carrier Aggregation Duplication (CA-Duplication) and Dual Connectivity Duplication (DC-Duplication) for the PDCP entity, wherein at least two RLC entities among the more than two RLC entities are associated with one of a master MAC entity (M-MAC) for a Master Cell Group (MCG) and a secondary MAC entity (S-MAC) for a Secondary Cell Group (SCG);

receive, from the BS, activation of a PDCP Combine-Duplication;

activate the Combine-Duplication for the PDCP entity; and submit a PDCP Protocol Data Unit (PDU) to a set of activated RLC bearers among a plurality of RLC bearers associated with the more than two RLC entities.

2. The UE of claim 1, wherein the RRC message is one of a RRC Reconfiguration message, a RRC Resume message, a RRC Reestablishment message, a RRC Setup message, and a downlink (DL) unicast RRC message.

3. The method of claim 1, wherein the PDCP Combine-Duplication is activated by one of RRC signaling and Medium Access Control (MAC) Control Element (CE).

4. The UE of claim 1, wherein each of the plurality of RLC bearers is one of activated and deactivated, independently of others of the plurality of RLC bearers.

5. The UE of claim 4, wherein the each of the plurality of RLC bearers is one of activated and deactivated done only when PDCP Combine-Duplication is activated.

6. The UE of claim 4, wherein the each of the plurality of RLC bearers is one of activated and deactivated by the BS.

7. A method for wireless communication performed by a user equipment (UE), the method comprising:

receiving, from a base station (BS), a radio resource control (RRC) message comprising a Packet Data Convergence Protocol (PDCP) configuration for a PDCP entity, the PDCP entity configured for being associated with more than two Radio Link Control (RLC) entities for Combine-Duplication, a combination of Carrier Aggregation Duplication (CA-Duplication) and Dual Connectivity Duplication (DC-Duplication) for the PDCP entity, wherein at least two RLC entities among the more than two RLC entities are associated with one of a master MAC entity (M-MAC) for a Master Cell Group (MCG) and a secondary MAC entity (S-MAC) for a Secondary Cell Group (SCG);

receiving, from the BS, activation of a PDCP Combine-Duplication;

activate the Combine-Duplication for the PDCP entity; and submitting the PDCP Protocol Data Unit (PDU) to a set of activated RLC bearers among a plurality of RLC bearers associated with the more than two RLC entities.

8. The method of claim 7, wherein the RRC message is one of a RRC Reconfiguration message, a RRC Resume message, a RRC Reestablishment message, a RRC Setup message, and a downlink (DL) unicast RRC message.

9. The method of claim 7, wherein the PDCP Combine-Duplication is activated by one of RRC signaling and Medium Access Control (MAC) Control Element (CE).

10. The method of claim 7, wherein each of the plurality of RLC bearers is one of activated and deactivated, independently of others of the plurality of RLC bearers.

11. The method of claim 10, wherein the each of the plurality of RLC bearers is one of activated and deactivated done only when PDCP Combine-Duplication is activated.

12. The method of claim 10, wherein the each of the plurality of RLC bearers is one of activated and deactivated by the BS.

* * * * *